(12) United States Patent
Nakanishi

(10) Patent No.: US 7,715,102 B2
(45) Date of Patent: May 11, 2010

(54) DISPLAY APPARATUS AND ELECTRONIC DEVICE

(75) Inventor: Hiroshi Nakanishi, Yawata (JP)

(73) Assignee: Sharp Kabushiki Kaisha, Osaka (JP)

( * ) Notice: Subject to any disclaimer, the term of this patent is extended or adjusted under 35 U.S.C. 154(b) by 17 days.

(21) Appl. No.: 10/590,825

(22) PCT Filed: Feb. 25, 2005

(86) PCT No.: PCT/JP2005/003679

§ 371 (c)(1),
(2), (4) Date: Aug. 25, 2006

(87) PCT Pub. No.: WO2005/083503

PCT Pub. Date: Sep. 9, 2005

(65) Prior Publication Data

US 2007/0171493 A1    Jul. 26, 2007

(30) Foreign Application Priority Data

Feb. 27, 2004    (JP) .............................. 2004-055215

(51) Int. Cl.
G02B 27/10    (2006.01)

(52) U.S. Cl. .................................... 359/619

(58) Field of Classification Search ......... 359/618–626, 359/592, 599
See application file for complete search history.

(56) References Cited

U.S. PATENT DOCUMENTS

| | | | |
|---|---|---|---|
| 5,101,279 A | 3/1992 | Kurematsu et al. | |
| 6,425,675 B2 | 7/2002 | Onishi et al. | |
| 7,027,227 B2 * | 4/2006 | Chiba et al. | 359/619 |
| 2002/0057413 A1 * | 5/2002 | Sumida et al. | 349/187 |
| 2002/0080323 A1 | 6/2002 | Muroya | |
| 2003/0214615 A1 | 11/2003 | Colgan et al. | |
| 2006/0250707 A1 * | 11/2006 | Whitney et al. | 359/599 |

FOREIGN PATENT DOCUMENTS

| | | |
|---|---|---|
| EP | 1 058 148 | 12/2000 |
| JP | 3-184019 | 8/1991 |

(Continued)

OTHER PUBLICATIONS

IDW'04 Phillips, "Brightness Enhancement in Transflective AMLCDs by using Micro-Lens Arrays," J. Bruinink et al., pp. 699-702.

(Continued)

*Primary Examiner*—Alicia M Harrington
(74) *Attorney, Agent, or Firm*—Nixon & Vanderhye P.C.

(57) ABSTRACT

In the present display apparatus, the directivity of light emitted from a backlight is set high in the direction along which a pixel pitch is long, and such light is caused to spread by a lenticular lens. In this manner, in the present display apparatus, the light entering the lenticular lens is parallelized by increasing the directivity of the light emitted from the backlight. For this reason, an amount of light whose traveling direction can be controlled by the lenticular lens (i.e. light focusing on pixels) can be increased, as compared to a display apparatus in which light emitted from a backlight has a low directivity. With this arrangement, both the frontal brightness and the viewing angle of a liquid crystal panel can be increased.

26 Claims, 16 Drawing Sheets

FOREIGN PATENT DOCUMENTS

| | | |
|---|---|---|
| JP | 5-96834 U | 12/1993 |
| JP | 7-306399 | 11/1995 |
| JP | 8-171099 | 7/1996 |
| JP | 8-313859 | 11/1996 |
| JP | 11-142835 A | 5/1999 |
| JP | 2000-98296 A | 4/2000 |
| JP | 2000-321431 | 11/2000 |
| JP | 3293589(B) | 4/2002 |
| JP | 2003-330007 | 11/2003 |

OTHER PUBLICATIONS

"Journal of the Society for Information Display," vol. 11, No. 4, IDMC 2003, p. 641-645.

International Search Report of PCT/JP2005/003679 mailed Apr. 5, 2005.

* cited by examiner

ORIGINAL FORM

MICRO LENS SUBSTRATE

MASTER MOLD

METAL STAMPER

MICRO LENS SUBSTRATE

METAL STAMPER

DEVIATION BETWEEN FOCAL POINT
OF LENS AND APERTURES OF DISPLAY PANEL ($\mu$m)

DISPLAY APPARATUS AND ELECTRONIC DEVICE

This application is the US national phase of the International application PCTJP2005/03679, filed 25 Feb. 2005, which designated the U.S. and claims priority of JP2004/55215filed 27 Feb. 2004, the entire contents of each of which are hereby Incorporated by reference.

TECHNICAL FIELD

The present invention relates to a display apparatus that reproduces (displays) an image by applying light from a backlight to a display panel and controlling the light transmittance states of pixels formed on the display panel.

BACKGROUND ART

Liquid crystal display apparatuses have widely been used for display units, projectors, mobile phones, handheld information terminals, and the like.

Such a liquid crystal display apparatus is a non-self-luminous display apparatus that reproduces an image by utilizing light applied from either (i) a light source provided inside the apparatus or (ii) the outside of the apparatus.

In the non-self-luminous display apparatus, the aforesaid light is applied to the display panel having pixels that are arranged in a matrix manner with predetermined intervals. A drive signal (drive voltage) corresponding to a displayed image (including texts) is separately supplied to each pixel.

The supply of the drive signal varies the transmittance (or reflectance) at each pixel part of the display panel. This makes it possible to partially modulate the intensity of display light, and allows the panel to display an image thereon.

There are two types of such a non-self-luminous display apparatus: a direct-view display apparatus that allows the user to directly view an image reproduced on the display panel; and a projection display apparatus (projector) that magnifies an image on the display panel and projects the image on a screen, using a projection lens.

Apart from the liquid crystal display apparatus, known examples of the non-self-luminous display apparatus include an electrochromic display panel, an electrophoretic display panel, toner display panel, and a PLZT panel.

Furthermore, there are three types of the aforesaid display apparatuses: a reflection type; a transmission type; and a semi-transmission type.

A reflection-type display apparatus allows light (outside light) to enter the inside of the display panel and reflects the light on a reflection layer, so as to obtain display light.

A transmission-type display apparatus is arranged in such a manner that light from a light source (backlight) provided behind the display panel is emitted to the outside via the display panel.

In a poorly-illuminated place, a semi-transmission-type display apparatus reproduces an image in a transmissive manner, using light emitted from the backlight. On the other hand, in a well-illuminated place, the semi-transmission-type display apparatus reproduces an image using ambient light. In this way, an image with a high contrast ratio is reproduced irrespective of the brightness of ambient light.

In a liquid crystal display apparatus, the optical characteristics (transmittance and reflectance) of a liquid crystal layer in a liquid crystal display panel (liquid crystal panel) are varied by applying the above-described drive signal to pixels.

In this relation, there are two ways of separately applying a drive signal to each pixel: simple matrix and active matrix.

In the active matrix, switching elements and wiring for supplying a drive voltage to pixel electrodes must be provided on the liquid crystal panel. Examples of the switching element are a non-linear two-terminal element such as an MIM (Metal-Insulator-Metal) element and a three-terminal element such as a TFT (Thin Film Transistor) element.

The switching element (especially the TFT element) thus described has such a characteristic that the resistance of the element in the off state decreases upon receiving intense light. On this account, when voltage is applied, an electric charge charged in a pixel capacity (picture element capacity) is discharged, so that a particular state of display cannot be achieved (e.g. leakage of light occurs even in a case of black display, thereby decreasing the contrast ratio).

To prevent light from entering the TFT (channel area in particular), there is such a conventional solution that a light shielding layer (termed black matrix) is provided on a part of a TFT substrate on which TFTs and pixels electrodes are formed or on a part of an opposing substrate facing the TFT substrate with a liquid crystal layer being interposed therebetween.

This type of the light shielding layer is desirable for a reflective liquid crystal display apparatus, because a reflective electrode can be used as a light shielding layer, so that the provision of the reflective electrode does not reduce the area of effective pixels.

On the contrary, in a transmissive liquid crystal display apparatus that reproduces an image by utilizing transmitted light, no existing members can be used as the light shielding layer.

For this reason, in addition to non-transmissive TFTs, gate bus lines, and source bus lines, a light shielding layer is further provided in the transmissive liquid crystal display apparatus. This reduces the area of the effective pixels, reduces the ratio (open area ratio) between the total area of the display section and the effective pixel area, and consequently decreases the brightness.

Furthermore, the open area ratio significantly decreases as the resolution of the liquid crystal panel increases and the size of the liquid crystal panel decreases. This is because, even if the pixel pitch is shortened, the TFTs and bus lines cannot be reduced in size beyond certain levels, on account of the constraints in electrical characteristics, manufacturing technology, and the like.

In particular, semi-transmission-type liquid crystal display apparatuses, which are adopted as a small display apparatus for a handheld device such as a mobile phone, are arranged such that each pixel has an area (reflective area) where a display is created in a reflection mode and an area (transmission area) where a display is created in a transmission mode. For this reason, if the pixel pitch is shortened, the ratio between the total of the display area and the transmission area (i.e. the open area ratio of the transmission area) significantly reduces, so that the decrease of the brightness gets worse.

In a case of a direct-view liquid crystal display apparatus and a single-plate projector that utilize the absorption of light by a color filter in order to reproduce a color image, the efficiency of the use of light (i.e. brightness) further decreases.

The following is a list of prior art documents.

Document 1; Japanese Patent No. 3293589 (registered on Jun. 17, 2002)

Document 2 Japanese Laid-Open Patent Application No. 2002-62818 (published on Feb. 28, 2002)

Document 3; Japanese Laid-Open Patent Application No. 2002-42528 (published on Feb. 8, 2002)

Document 4; Journal for Information Display, Vol. 11, No. 4 2003, pp 641-645 (published in November, 2003)

DISCLOSURE OF INVENTION

The objective of the present invention is to provide a display apparatus that can easily improve the display brightness of a display panel (e.g. liquid crystal panel).

To achieve this objective, the display apparatus of the present invention (i.e. present display apparatus), which reproduces an image by applying light from a backlight to a display panel and controlling light transmittance states of pixels provided, on the display panel, in a matrix manner, is characterized in that the display panel includes a micro lens array including a group of micro lenses corresponding to the pixels, the pixels on the display panel are disposed in a matrix manner and along a first direction and a second direction orthogonal to the first direction, and a pitch of the pixels in the first direction is longer than a pitch of the pixels in the second direction, and a directivity of the light traveling in the first direction is higher than a directivity of the light traveling in the second direction.

The present display apparatus is a non-self-luminous display apparatus that reproduces images by utilizing light emitted from a backlight that is an internal light source. That is, in the present display apparatus, the light emitted from the backlight is applied to a display panel including pixels orderly disposed in a matrix manner, and a drive signal (drive voltage) corresponding to an image (including texts) to be displayed is separately applied to each pixel.

With this, the transmittance of each pixel on the display panel is varied, so that the intensity of the display light is partially modulated. This arrangement enables the display panel to reproduce an image thereon.

In the present display apparatus, provided that the arranging directions of the pixels on the display panel are a first direction and a second direction (orthogonal to the first direction), the pitch of the pixels in one direction (hereinafter, first direction) is longer than the pitch of the pixels in the second direction.

In particular, the present display apparatus is arranged in such a manner that, to the display panel, the backlight applies light whose directivity in the first direction is higher than the directivity in the second direction.

It is noted that the directivity indicates to what extent the light emitted from the backlight section to the display panel is oriented to a particular direction. This directivity of light can be expressed in an intensity half-width angle (an angle with which the intensity is half as much as the maximum value) in the intensity distribution (light distribution) of the emitted light. The narrower the half-width angle is, the higher the directivity is and the more the light resembles parallel light (described later).

On the surface on the side of receiving the light from the backlight, the display panel of the present display apparatus is provided with a micro lens array including a plurality of micro lenses. Each micro lens is designed so as to have a focal point at around the pixels of the display panel.

The focal point of the micro lens is a point where the width of the outgoing light is minimized (i.e. a point where the beam waist is minimized), when parallel light enters the micro lens. The parallel light is light traveling in the direction orthogonal to the surface of the micro lens (i.e. the surface of the display panel).

In the present display apparatus, therefore, the parallel light entering the micro lens is refracted in such a manner as to focus on around the pixels. After passing through the pixels, the light spreads so as to widen its directivity (viewing angle).

The collection (convergence) of light by the micro lenses is particularly effective in a case where the pitch of the pixels is long. That is to say, in the second direction along which the pitch of the pixels is shorter than the pitch in the first direction, the converging (collecting) angle of the micro lens is small, and hence the collection of light is not effective in this direction.

In the present display apparatus, in the first direction along which the micro lenses are effective (i.e. the pitch of the pixels is long), the directivity of the light emitted from the backlight is increased so that the light is brought near to parallel light. After passing through the pixels, the light is caused to spread by the micro lenses.

In the meanwhile, in the second direction along which the micro lenses are not effective (i.e. the pitch of the pixels is short), the directivity of the light emitted from the backlight is kept low (i.e. a spread angle is set wide), so that the viewing angle of the light is widened before reaching the micro lenses.

With the arrangement above, the viewing angle of the display panel of the present display apparatus is wide in both the first and second directions.

In the present display apparatus, the frontal brightness is improved by increasing, in the first direction, the directivity of the light emitted from the backlight. Also, thanks to this increase in directivity, light that has been blocked by the BM and the like is collected (converged) by the micro lenses and passes through pixel apertures (parts of the pixels where light can pass through), so that an amount of light that can pass through the pixels is increased.

On this account, in the present display apparatus, the frontal brightness of the display panel is better than that of a conventional display apparatus in which the directivity of the light emitted from the backlight is low.

Among sets of light collected by the micro lenses, the light entering around the end of the micro lenses is refracted by the micro lenses and collected. On this account, in the present display apparatus, the brightness is improved in a wide range of viewing angles (directivities).

If the micro lenses are not provided in the present display apparatus, the brightness in the frontal direction is still improved because the directivity of the light emitted from the back light is high in the first direction. However, in the first direction, the viewing angle of the display panel is very narrow.

For a fuller understanding of the nature and advantages of the invention, reference should be made to the ensuing detailed description taken in conjunction with the accompanying drawings.

BRIEF DESCRIPTION OF DRAWINGS

FIG. 15(a) explains a polarization cross angle, while FIG. 15(b) is a graph showing the relationship between the (relative) intensity of light exiting the liquid crystal panel and the polarization cross angle.

BEST MODE FOR CARRYING OUT THE INVENTION

The present invention will be described in a detailed manner, with an embodiment. It is noted that the embodiment does not put limitations to the present invention whatsoever.

The following will discuss an embodiment of the present invention.

A liquid crystal display apparatus (present display apparatus) of the present embodiment is a direct-view semi-transmission-type liquid crystal display apparatus that can be suitably adopted as a display screen of an electronic device such as a mobile phone, a PDA (Personal Digital Assistant), a digital camera, a liquid crystal display unit, and a liquid crystal display TV set.

Figure 1:
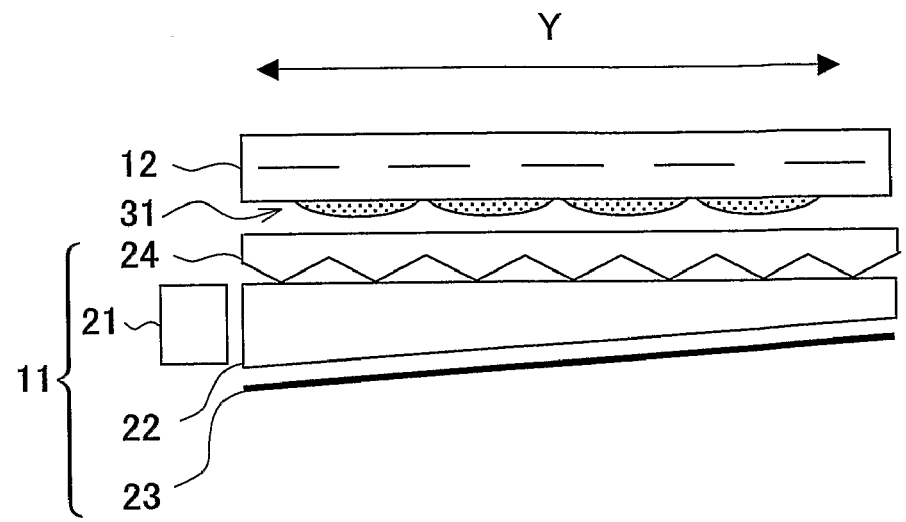
FIG. 1 is a cross section of a liquid crystal display apparatus of an embodiment of the present invention.

FIG. 1 is a cross section of the present display apparatus. As the figure shows, the present display apparatus is provided with a backlight section 11 and a liquid crystal panel 12.

The liquid crystal panel 12 has pixels disposed in a matrix manner, and is a non-self-luminous display panel that reproduces images (including texts) by controlling the transmittance or reflectance of each pixel.

Figure 2:
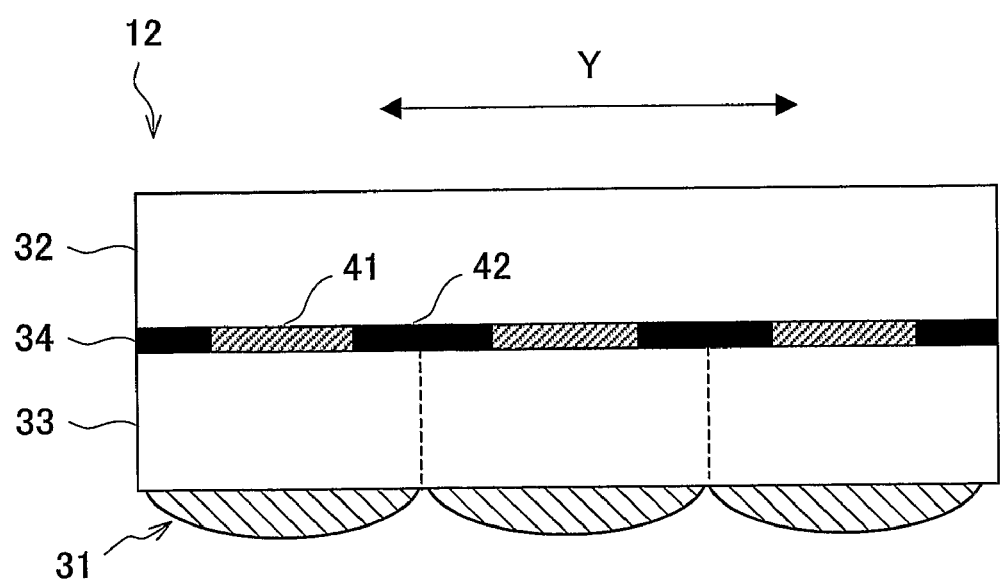
FIG. 2 is a cross section of a liquid crystal panel of the liquid crystal display apparatus of FIG. 1.

FIG. 2 is a cross section of the liquid crystal panel 12. As the figure shows, the liquid crystal panel 12 is arranged in such a manner that a liquid crystal layer 34 is sandwiched between an opposing substrate 32 and a TFT substrate 33, and a lenticular lens array 31 is further provided on the TFT substrate 33.

This liquid crystal panel 12 is a 2.4-inch panel with 320 (H)×240(V) dots (stripe arrangement) and 153×51 μm pixel pitches. Also, the liquid crystal panel 12 is a semi-transmission-type liquid crystal panel whose open area ratio is 50%.

Being a semi-transmission-type, each pixel 41 of the liquid crystal panel 12 has a pixel aperture for letting light exiting the backlight section 11 pass through.

Furthermore, a black matrix section 42 is provided between the pixels 41. This black matrix section 42 includes a reflective electrode that reflects outside light. With this, the liquid crystal panel 12 can vividly reproduce images irrespective of the brightness of ambient light.

Figure 3:
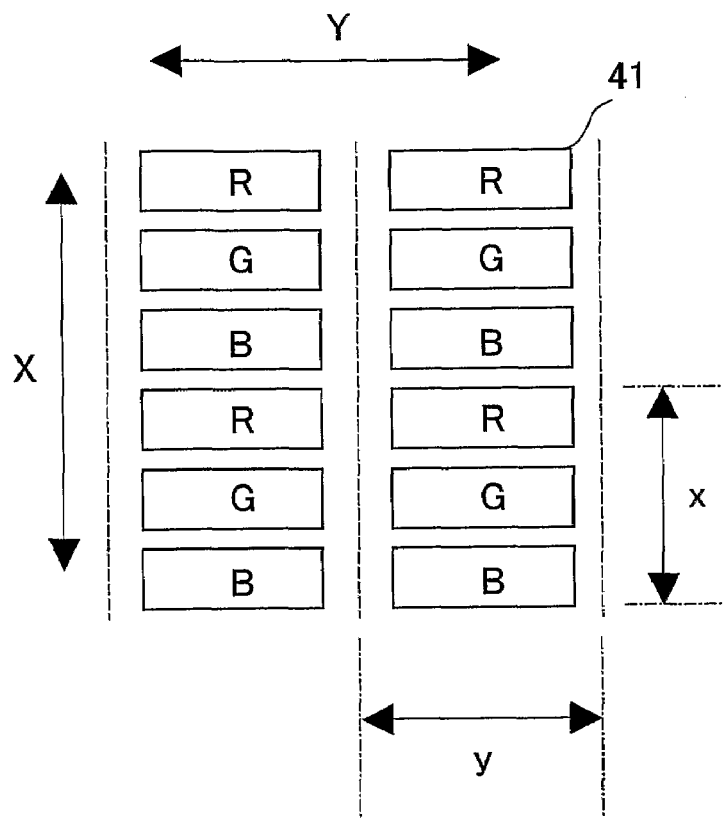
FIG. 3 illustrates how pixels formed in a liquid crystal layer shown in FIG. 2 are disposed.

FIG. 3 illustrates how the pixels 41 formed on the liquid crystal layer 34 are disposed.

As shown in the figure, on the liquid crystal panel 12, the pixels 41 are disposed in such a manner as to correspond to R (red), G, (green), B (blue), R (red), G, (green), B (blue) and so forth, along the X direction shown in FIGS. 1 and 3.

Each pixel 41 has a rectangular shape and is short in the X direction (second direction) while long in the Y direction (first direction) orthogonal to the X direction. With this shape, the pitch (x) of groups each including three pixels 41 corresponding to R, G, and B and aligned in the X direction is identical with the pitch (y) of the pixels in the Y direction. (It is noted that, in the X direction, three pixels 41 corresponding to R, G, and B are counted as one group.) For this reason, the pitch of the pixels 41 in the X direction is one third of the pitch of the pixels 41 in the Y direction. It is noted that the pixel pitch in the X direction or Y direction is a distance from the center of one pixel 41 to the center of the neighboring pixel 41 in the X/Y direction.

The lenticular lens array 31 shown in FIG. 1 and the like causes the light emitted from the backlight section 11 to concentrate on the pixels 41 of the liquid crystal layer 34, in order to improve the effective open area ratio of the liquid crystal panel 12. The light, which has been collected by the lenticular lens array 31 (micro lens) and has passed through the pixel aperture section 43, spreads with the same converging angle. On this account, this light basically widens the directivity.

Figure 4:
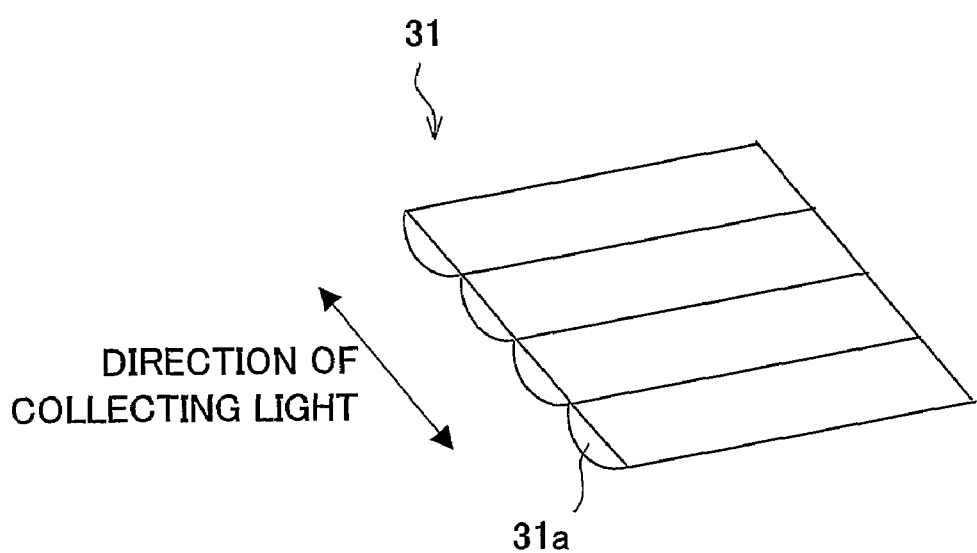
FIG. 4 shows the shape of a lenticular lens formed in the liquid crystal layer of FIG. 2.

FIG. 4 shows the shape of the lenticular lens array 31. As this figure shows, the lenticular lens array 31 is arranged such that lenticular lenses 31a each being narrow and shaped like a part of a cylinder are disposed in parallel to each other.

This lenticular lens 31a cannot collect light in the longitudinal direction of the cylinder, while can collect light in the direction of traversing the cylinder.

In the present display apparatus, the lenticular lens array 31 is attached on the liquid crystal panel 12 in such a manner as to align the longitudinal direction of the lenticular lens 31a with the X direction. (Note that a dotted line in FIG. 2 shows how the lenticular lenses 31a are disposed.)

Figure 5:
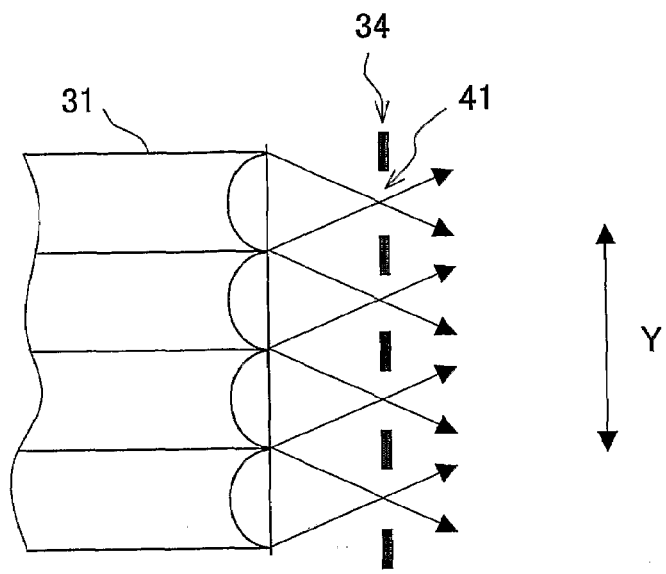
FIG. 5 illustrates in what manner the lenticular lens of FIG. 4 collects light.

FIG. 5 shows in what manner the lenticular lens array 31 collects light. As shown in the figure, the direction of collecting light by the lenticular lens 31a is orthogonal to the longitudinal direction of the lenticular lens 31a (i.e. the direction of collecting light is identical with the Y direction).

Furthermore, as shown in FIG. 5, each lenticular lens 31a focuses on the pixels of the liquid crystal layer 34, i.e. the beam waist of each lenticular lens 31a is minimum at the pixels 41. The TFT substrate of the liquid crystal panel 12 (i.e. the substrate on the lenticular lens array 31 side) is 300 μm thick.

On this account, the converging angle of the lenticular lens array 31 in the Y direction (i.e. the direction of collecting light by the lenticular lens 31a) is:

$$\tan^{-1}(153(\text{pitch}) \times 1.52 \text{ (refractive index of glass)}/2/300 \text{ (thickness of substrate)}) = 21°$$

The backlight section 11 is provided for applying light to the liquid crystal panel 12 in order to display an image thereon. This backlight section 11 adopts a technology described in Document 4.

Figure 6:
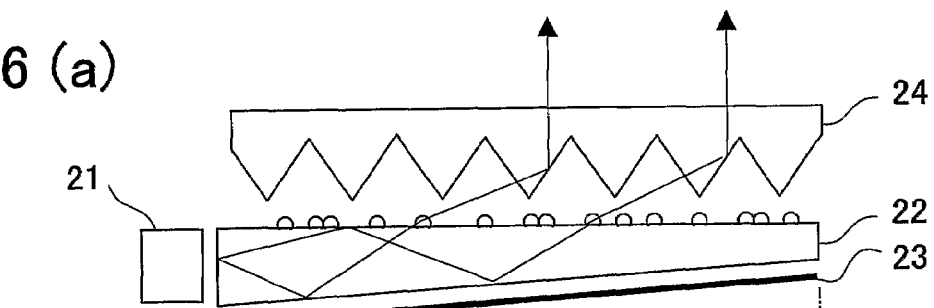
FIGS. 6(a) and 6(b) illustrate a backlight section.
Figure 6:
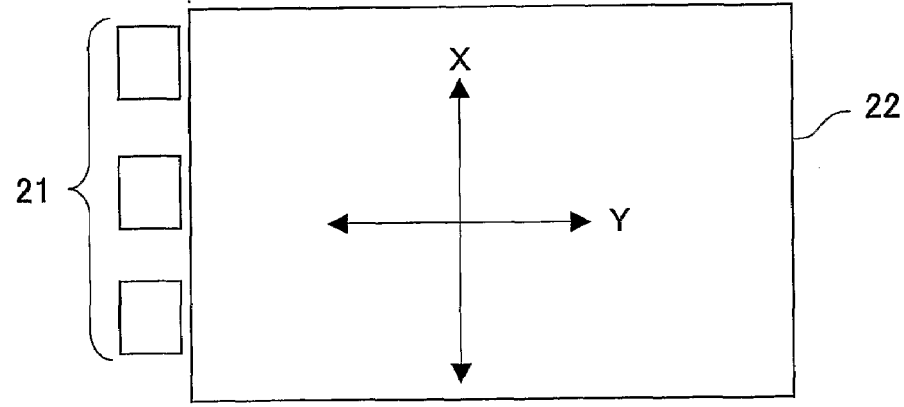

FIGS. 6(a) and 6(b) illustrate the backlight section 11. As these figures show, the backlight section 11 is provided with LEDs 21, an optical waveguide 22, a reflective plate 23, and a prism sheet 24.

The LED (Light Emitting Diode) 21 is a dot-shaped light source that generates light to be applied to the liquid crystal panel 12. As shown in FIG. 6(b), in the backlight section 11, a plurality of LEDs 21 are disposed in line along one side (incoming end face) of the optical waveguide 22.

The optical waveguide 22 converts the light, which is emitted from the LEDs 21, to planar light (light emitted from an area having a predetermined size), by causing the light to total-reflect in the optical waveguide 22 and to propagate through the optical waveguide 22. Then the optical waveguide 22 emits the light from its surface (optical outgoing surface), towards the liquid crystal panel 12.

On the surface of the optical waveguide 22, a lot of microdots MD are provided. These microdots MD are used for adjusting an amount of light emitted from the optical waveguide 22 (in reality, the optical waveguide 22 is tapered so that light exceeding the conditions for the total reflection is also emitted therefrom).

The reflective plate 23 prevents light from reaching the back surface (surface on the side of not being provided with the liquid crystal panel 12) of the optical waveguide 22.

The prism sheet 24 is provided on the reflective plate 23 and adjusts the light path of the light coming from the optical waveguide 22. In other words, the prism sheet 24 (i) totally reflects, on the prism surface, the light emitted in an oblique direction from the surface of the optical waveguide 22, and (ii) causes the light to head for the frontal direction (direction orthogonal to the surface of the liquid crystal panel 12).

Figure 7:
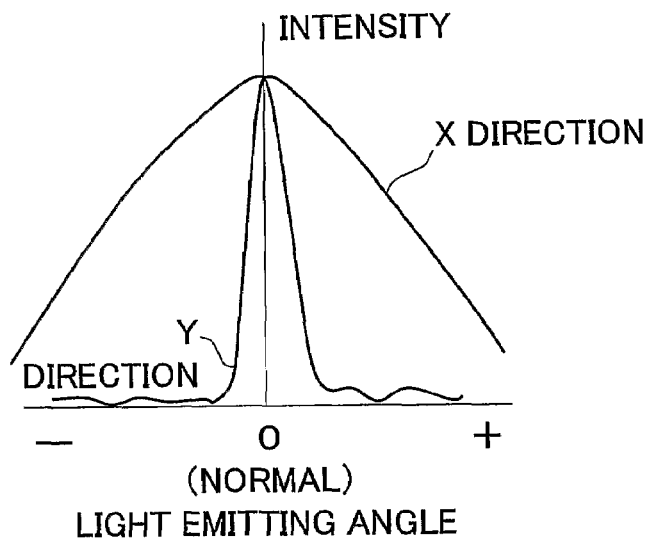
FIG. 7 is a graph showing the directivity of light exiting the backlight section of FIGS. 6(a) and 6(b).

FIG. 7 is a graph showing the directivity of the light emitted from the above-described backlight section 11. As the figure illustrates, the light emitted from the prism sheet 24 has a high (narrow; ±12°) directivity in the Y direction and has a low (wide; ±25°) directivity in the X direction.

It is noted that the directivity indicates to what extent the light emitted from the backlight section 11 (prism sheet 24) is oriented to a particular direction.

The aforesaid angles (±12° and ±25°) are half-width angles (angles with which the intensity is half as much as the maximum value) in the intensity distribution (light distribution) of the emitted light, and the angles act as indicators of directivities. The narrower the half-width angle is, the higher the directivity is.

As described above, in the backlight section 11, the directivity in the Y direction (direction orthogonal to the longitudinal direction of the light source (or the light source array)) is higher than the directivity in the X direction. This is because, as shown in FIG. 6(b), in the backlight section 11, a plurality of LEDs 21 are disposed in line along the side (edge part) of the optical waveguide 22, in the X direction.

On this account, at a given point (location) in the waveguide 22, light beams having different traveling directions are supplied from the LEDs 21 disposed at different locations. In other words, the X-direction components (light components in the arranging direction of the LEDs 21) of the light entering a point in the optical waveguide 22 diversify (i.e. the distribution of incident angles in the X direction is enlarged). The directivity in the X direction therefore becomes wider.

In the present display apparatus being thus arranged, the light emitted from the backlight section 11 enters the lenticular lens array 31 of the liquid crystal panel 12, with a wide (±25°) directivity in the X direction and a narrow (±12°) directivity in the Y direction.

Figure 8:
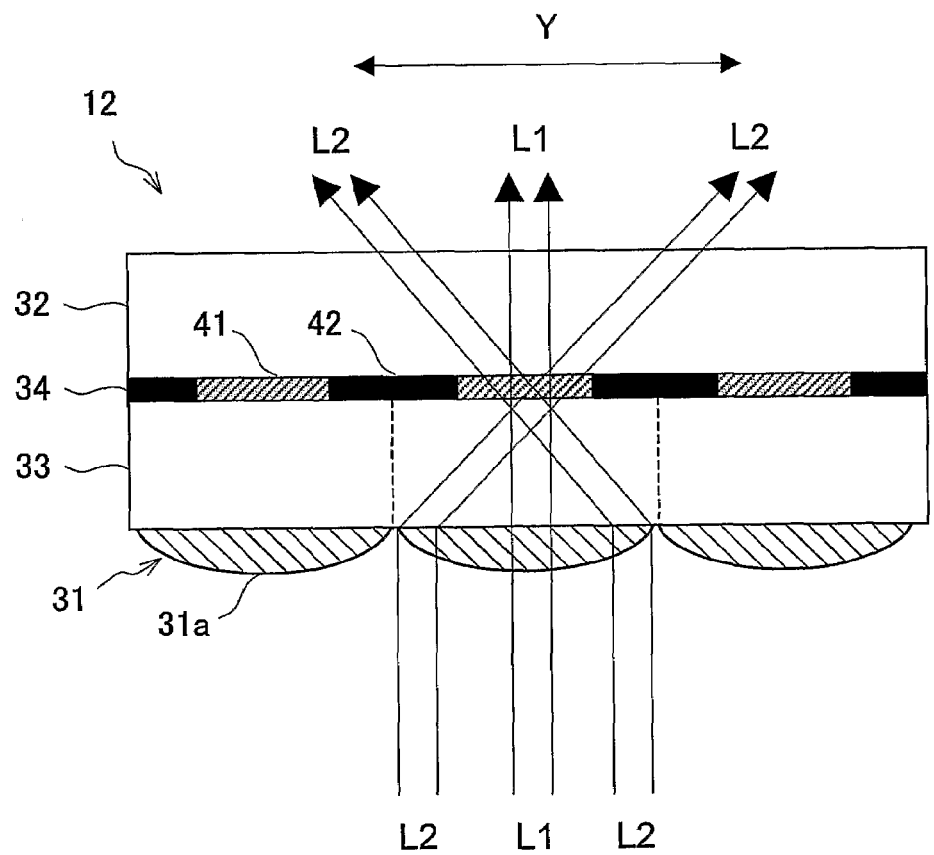
FIG. 8 illustrates the state of light entering the lenticular lens of the liquid crystal panel of FIG. 2 and passing through the pixels in the liquid crystal layer.

FIG. 8 shows the state of light entering the lenticular lens array 31 of the liquid crystal panel 12 and passing through the pixels 41 in the liquid crystal layer 34.

As this figure shows, among the sets of light entering the lenticular lens array 31, light L1 passing in the vicinity of the apex of the lenticular lens 31a is rarely refracted. On this account, the light L1 passes, with almost no refraction, through the lenticular lens 31a, and enters the pixels 41. That is, the state of the light L1 entering this area is almost identical with the state of the light L1 in a case where the lenticular lens array 31 is not provided.

Meanwhile, light L2 passing in the vicinity of the edge of the lenticular lens 31a is greatly refracted by the lenticular lens 31a, so that the directivity of the incoming light is widened.

As described above, the converging angle of the lenticular lens array 31 in the direction of collecting light (i.e. in the Y direction) is ±21°.

Figure 9:
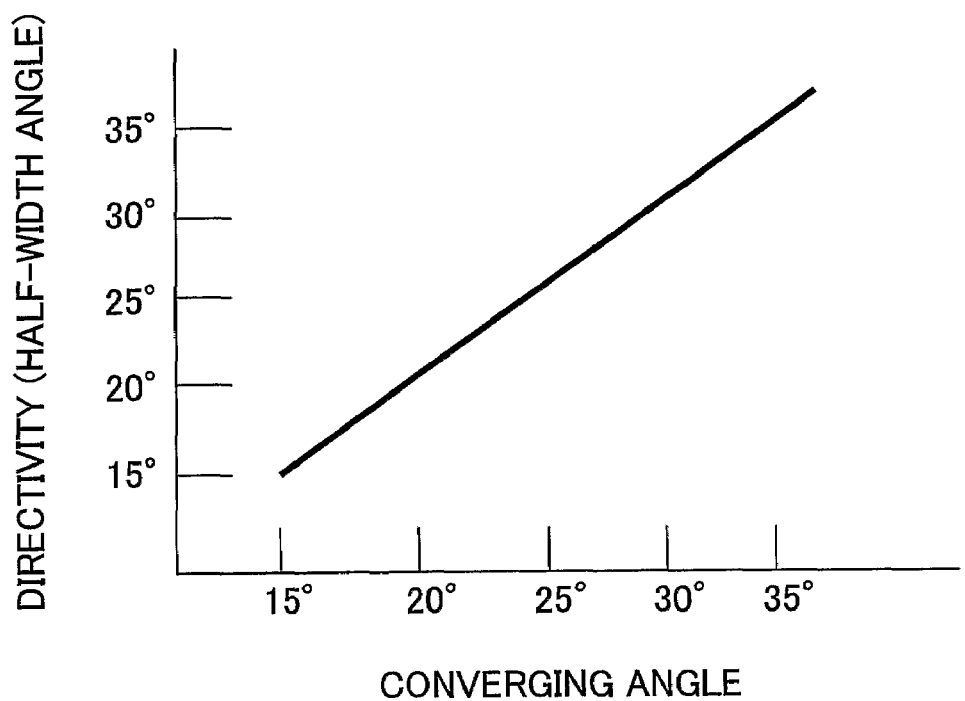
FIG. 9 is a graph showing the relationship between (i) a converging angle of the lenticular lens of the liquid crystal panel of FIG. 2 and (ii) the directivity of light exiting the lenticular lens.

FIG. 9 shows the relationship between the converging angle of the lenticular lens array 31 and the directivity of the light emitted from the lenticular lens array 31. As the graph shows, the directivity of the light is roughly in proportion to the converging angle of the lens.

Thus, thanks to its light-collecting capability, the lenticular lens array 31 keeps the viewing angle of the incoming light to ±25° in the X direction, while widens the viewing angle to ±21° in the Y direction. With this, the light having passed through the liquid crystal panel 12 has a directivity of ±25° in the X direction and a directivity of ±21° in the Y direction.

As described above, in the present display apparatus, the backlight section 11 emits, to the liquid crystal panel 12, light whose directivity is high in the Y direction. That is, the backlight beam has a half-width angle of 12° in the Y direction.

The liquid crystal panel 12 of the present display apparatus has, on the side of receiving the light from the backlight, the lenticular lens array 31 composed of the lenticular lenses 31a. Each of these lenticular lenses 31a is designed so as to focus on in the vicinity of the pixels 41 of the liquid crystal panel 12.

On this account, in the present display apparatus, most of the light entering the lenticular lens 31a are refracted so as to focus on in the vicinity of the pixels 41. After passing through the pixels 41, the light spreads in such a manner as to widen the directivity thereof.

The collection of light by a micro lens array such as the lenticular lens array 31 is particularly effective in a case where the pitch of the pixels 41 is long. That is, since the pitch in the X direction is shorter than the pitch in the Y direction, the converging angle of the micro lenses (lenticular lens 31a) is small in the X direction and hence, in the X direction, the effect of widening the directivity is not prominent.

In the present display apparatus, in the Y direction along which the lenticular lens 31*a* is effective (the pitch of the pixels 41 is long), the directivity of the light emitted from the backlight is increased so as to be similar to that of parallel light. Such light is caused to spread by the lenticular lens array 31, after passing through the pixels 41.

In the meanwhile, in the X direction along which the lenticular lens 31*a* (micro lens) is not effective (the pitch of the pixels 41 is short), the directivity of the light emitted from the backlight is widened, so that the viewing angle of the light is widened before reaching the lenticular lens array 31.

In this manner, in the present display apparatus, the viewing angle of the liquid crystal panel 12 is widened in both the X and Y directions.

In the present display apparatus, the directivity of the light emitted from the backlight is increased in the Y direction, so that the light entering the lenticular lens array 31 is further parallelized and an amount of light that can pass through the pixels 41 is increased.

On this account, the frontal brightness of the display panel is improved as compared to a conventional display apparatus in which the light emitted from the backlight has a low directivity. Furthermore, among the sets of light collected by the micro lenses (lenticular lens array 31), the directivity of the light L2 shown in FIG. 8 is widened. This makes it possible to increase the brightness while keeping a wide viewing angle (directivity).

Figure 24:
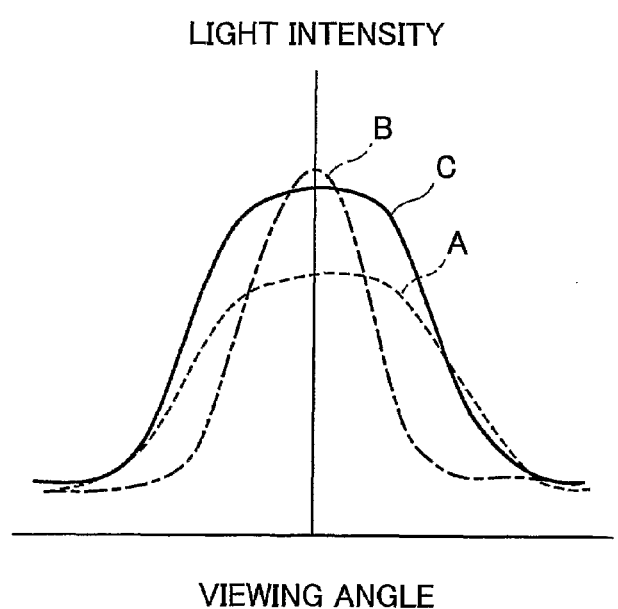
FIG. 24 is a graph showing the relationship between the intensity of light exiting the display panel and a viewing angle (angle of viewing the display panel, assuming that an angle to the normal of the panel is 0°).

FIG. 24 is a graph showing the relationship between the intensity of light emitted from the display panel and the viewing angle (angle of viewing the display panel, assuming that an angle to the normal of the panel is 0°).

A curve A in the graph relates to a conventional display apparatus in which the backlight emits light having a low directivity (intensity half-width angle; 25°) in all directions, and a micro lens array such as the lenticular lens array is not provided.

As the graph shows, the frontal brightness of this conventional apparatus is very low.

Meanwhile, a curve B in the graph relates to a liquid crystal display apparatus that is provided with a backlight section 11 similar to that of the present display apparatus but is not provided with the micro lens array. As the graph shows, in this arrangement, the frontal brightness is high but the light intensity is highly dependent on the viewing angle (i.e. the viewing angle is narrow).

Last of all, a curve C in the graph relates to the present display apparatus. As the graph indicates, the present display apparatus can realize both a high frontal brightness and a wide viewing angle. (The frontal brightness of this apparatus is 1.3 times higher than the frontal brightness of the conventional apparatus related to the curve A).

In the present display apparatus, an intensity half-width angle of the light emitted from the backlight is 12° in the X direction. The intensity half-width angle is, however, not limited to this, and is preferably not more than ±20°. If the angle is set so, the frontal brightness and the viewing angle of the present display apparatus are in good conditions.

An intensity half-width angle of conventional light emitted from a backlight (i.e. light whose directivity is not enhanced) is in the range between ±20° and ±30°. Therefore, in the direction along which the directivity of light is ±20° or less, it is preferable that the directivity of light be widened by a micro lens array such as the lenticular lens array 31.

The present display apparatus is provided with the lenticular lens array 31 as a micro lens array. This lenticular lens array 31 is superior to a micro lens array having micro lenses that can collect light in different directions, in terms of cost and easiness of manufacture. For this reason, the manufacturing cost of the present display apparatus is restrained by adopting such a lenticular lens 31*a*.

In the present display apparatus, the converging angle of the lenticular lens 31*a* is 21°. In this manner, the converging angle of the lenticular lens 31*a* is preferably within the range between 20° and 30°. With this, the viewing angle of the liquid crystal panel 12 is suitably set (so as to be similar to the viewing angle in the Y direction).

In the present embodiment, the present display apparatus is provided with the backlight section 11 adopting the LEDs 21. The present display apparatus, however, may adopt a backlight section 51 shown in FIGS. 10(*a*) and 10(*b*), in place of the backlight section 11.

Figure 10:
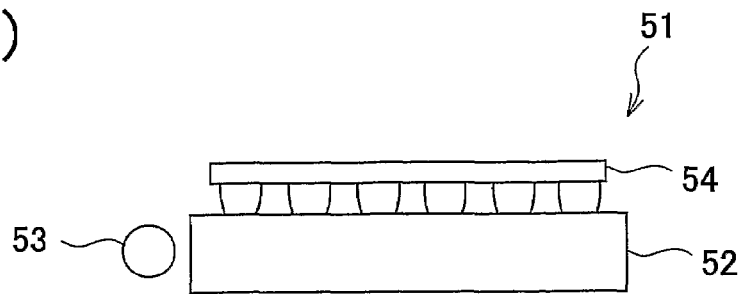
FIGS. 10(a) and 10(b) illustrate a backlight section that the liquid crystal display apparatus of FIG. 1 can adopt.
FIG. 10(c) is a graph showing the directivity of light exiting that backlight section.
Figure 10:
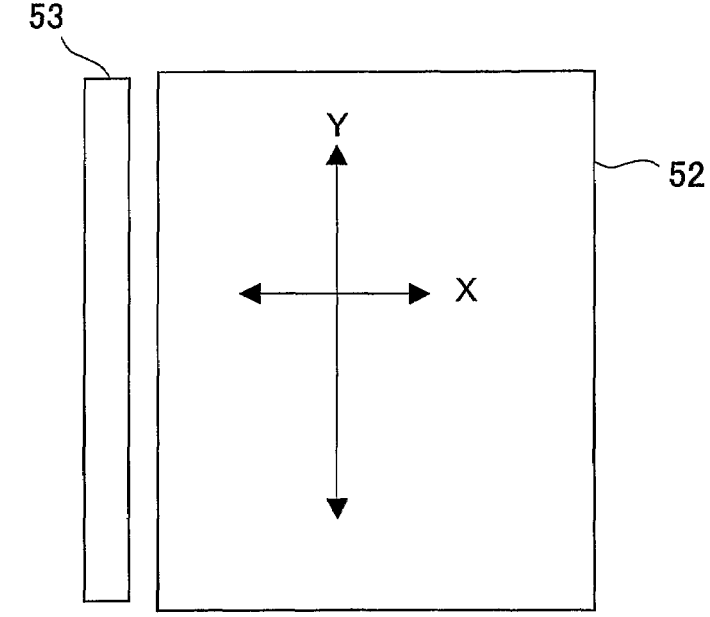
Figure 10:
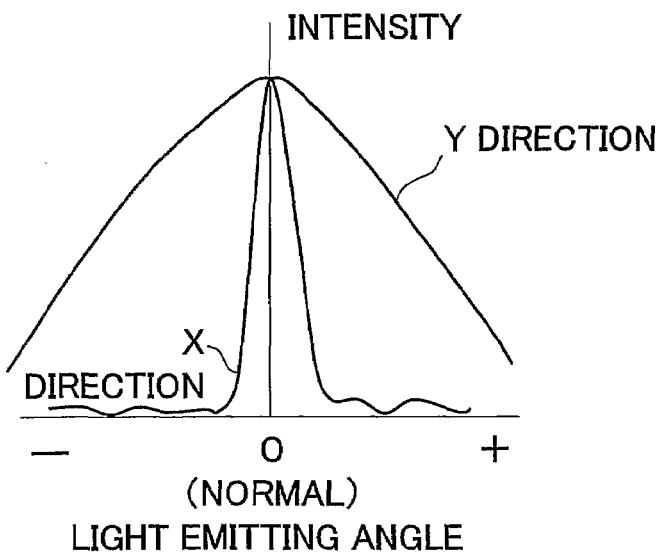

The backlight section 51 shown in FIGS. 10(*a*) and 10(*b*) is disclosed by Document 3.

The backlight section 51 is arranged in such a manner that a cold-cathode tube 53 as a light source is provided on one side of a light guiding member 52. Also, on an optical outgoing surface (surface on the liquid crystal panel 12 side) of the light guiding member 52, a prism 54 (or a lens array) is provided.

The backlight section 51 is arranged in such a manner that apex sections on the prism 54 (or the lens array) are put in touch with the optical outgoing surface of the optical waveguide 30, and light is obtained from the points of contact.

Being different from the backlight section 11, the backlight section 51 is arranged so that, as shown in FIG. 10(*c*), the directivity of light is high (±10°) in the longitudinal direction of the cold-cathode tube 53 (i.e. in the direction along the light source (or the light source array)), while the directivity of light is low (±25°) in the direction orthogonal to the aforesaid longitudinal direction.

On this account, in a case where the backlight section 51 is adopted, the longitudinal direction of the cold-cathode tube 53 is preferably set as the Y direction, as shown in FIG. 10(*b*). With this, the effects (high frontal brightness and wide viewing angle) similar to those in the case where the backlight 11 is adopted can be obtained also when the backlight section 51 is adopted.

Apart from the LEDs and the cold-cathode tube, any types of light sources (e.g. xenon tube) may be adopted to the backlight section 11.

It is, however, preferable that the backlight section 11 (or the light source) be disposed in such a manner that the direction of light, which is emitted from the backlight section 11 and whose directivity is low, is set as the Y direction.

In the present embodiment, the focal point of each lenticular lens 31*a* of the lenticular lens array 31 (i.e. a point where the beam waist is minimized) is at the pixel 41 of the liquid crystal layer 34, as shown in FIG. 5.

Figure 11:
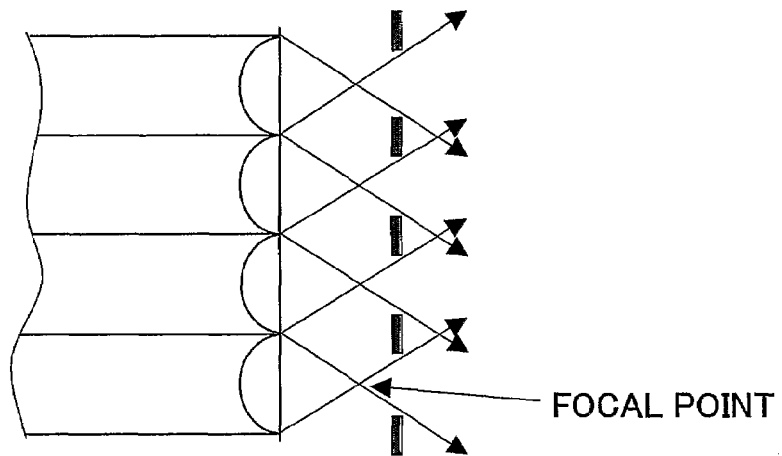
FIG. 11 illustrates another example of how the lenticular lens of FIG. 4 collects light.

However, as shown in FIG. 11, the focal distance of the lenticular lens 31*a* may be brought near to the lenticular lens array 31 side (i.e. the focal distance may be shortened) in such a manner as to set the converging angle of the lenticular lens 31*a* to 25°.

When the focal point is thus arranged and the thickness of the TFT substrate 33 on the lenticular lens array 31 side remains 300 μm, the frontal brightness is 1.2 times higher than that of a conventional spread-type backlight, but slightly lower than the frontal brightness in a case where the focal point is at the liquid crystal layer 34.

Even so, the frontal brightness of the case above is still higher than that of the conventional case, and the directivity (viewing angle) of light of the liquid crystal panel 12 is improved so as to be ±25° in both the X and Y directions. Furthermore, since the viewing angle is improved while the thickness of the TFT substrate 33 remains 300 µm, the decrease in the (glass) strength of the liquid crystal panel 12 is avoidable.

Figure 23:
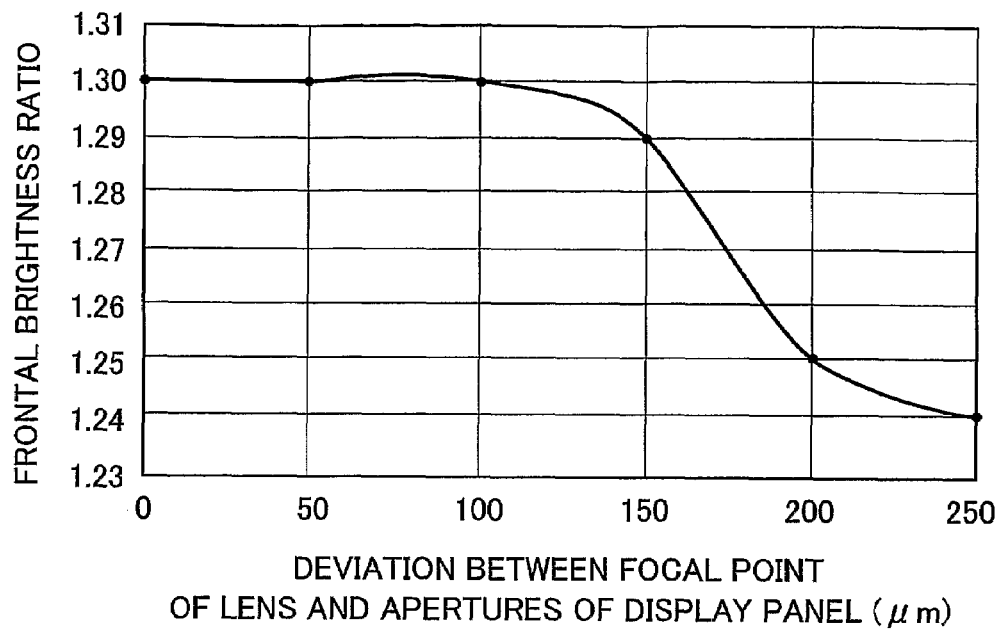
FIG. 23 is a graph showing the result of a calculation of the relationship between (i) a deviation between a pixel and the focal point of the lenticular lens and (ii) frontal brightness.

FIG. 23 is a graph showing the result of calculation of the relationship between (i) a deviation between a pixel and the focal point of the lenticular lens 31a and (ii) frontal brightness.

It is noted that the liquid crystal panel 12 used for this calculation is a 2.4-inch QVGA panel whose pixel pitches (pitches of the pixels 41) are 153×51 µm and the open area ratio of each pixel 41 is 40%. In the calculation, the thickness of the TFT substrate 33 (i.e. the position of the pixels 41) is varied within the range between 300 and 550 µm while the focal distance of each lenticular lens 31a is fixed at 300 mm, and the frontal brightness with each thickness is worked out.

As the graph indicates, in the aforesaid arrangement, the frontal brightness significantly decreases when the focal point of the lenticular lens 31a deviates from the pixels 41 for 150 mm or more.

On this account, in the present display apparatus, the deviation between the focal point of the lenticular lens 31a and the pixels 41 is preferably within one third of the thickness of the TFT substrate 33 (i.e. within one third of the distance between the lenticular lens 31a and the pixels 41).

The focal point of the lenticular lens 31a is preferably closer to the lenticular lens array 31 than to the pixels 41 but remains within the aforesaid range. With this, the viewing angle in the Y direction can be further widened.

Figure 12:
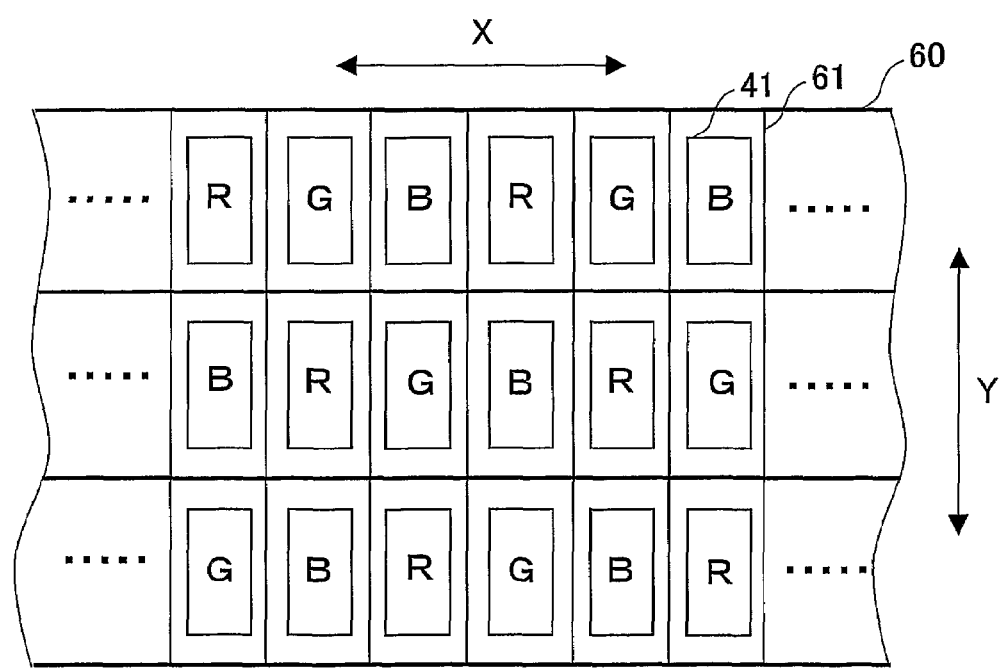
FIG. 12 illustrates a micro lens that the liquid crystal panel of FIG. 2 can adopt.

The present embodiment uses the lenticular lens array 31 arranged such that a plurality of lenticular lenses 31a each being narrow and shaped like a part of a cylinder are disposed in parallel to each other. Instead of this lenticular lens array 31, it is possible to adopt, as shown in FIG. 12, a micro lens array 60 including micro-scale lenses 61 (that can collect light both in X and Y directions) one-to-one corresponding to the pixels 41 of the liquid crystal layer 34.

Figure 13:
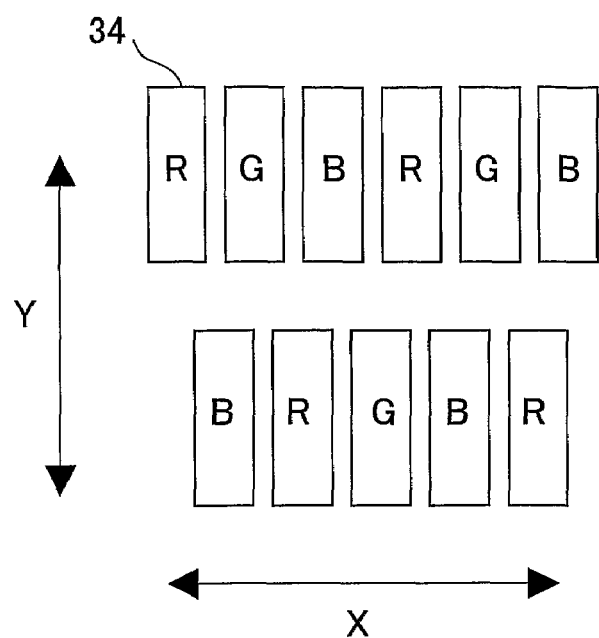
FIG. 13 illustrates delta-disposed pixels.

In the present embodiment, the pixels 41 of the liquid crystal layer 34 are aligned along the X direction as shown in FIG. 3. However, the pixels 41 may be disposed in a deltaic manner along the X direction, as shown in FIG. 13. Also in this case, the pitch of the pixels in the X direction is shorter than the pitch in the Y direction.

In this deltaic arrangement, in the Y direction, the row of pixels along the X direction deviates, by a half of the pixel pitch, from the row of pixels neighboring to the aforesaid row of pixels. On this account, in the deltaic arrangement, the positions of the pixels in the X direction are identical on every other rows (i.e. the pixels on every other rows are aligned in the Y direction). In this manner, also in the deltaic arrangement, the pixels 41 are aligned in the X and Y directions.

The present display apparatus is arranged such that, the backlight section 11 whose directivity in the arranging direction of the R, G, and B pixels 41 (i.e. X direction) is different from the directivity in the direction orthogonal to the aforesaid direction (i.e. Y direction), and in combination with the lenticular lens array 31 (micro lens array 60), the directivities in both of these directions are widened.

If it is desired to keep the directivity in one direction high, a backlight section with which the directivities in both the X and Y direction are high is adopted, and the directivity in one direction (Y direction) is widened using the lenticular lens array 31 (micro lens array 60).

In a case where the above-described arrangement is adopted to a mobile phone, the directivity in the vertical direction can be widened while the viewing angle in the horizontal direction is kept narrow. This arrangement is useful for preventing a person other than the user from viewing the image displayed on the liquid crystal panel 12. (While the user of the mobile phone can view the image, a person next to the user cannot easily peek at the image.)

Moreover, since the directivities in two directions are increased in the backlight section 11, an amount of light in the frontal direction, the light being able to pass through the pixels 41, can be further increased. This further improves the frontal brightness of the present display apparatus.

In the present embodiment, the liquid crystal panel 12 of the present display apparatus is a semi-transmission-type liquid crystal panel. However, instead of this semi-transmission-type, a transmission-type liquid crystal panel may be adopted as the liquid crystal panel 12 of the present display apparatus.

The following describes a case where light emitted from the backlight section 11 and traveling towards the liquid crystal panel 12 is polarization-dependent. For instance, a backlight disclosed by Document 4 generates planer light by means of total reflection. In this case, the planar light to be emitted is linearly polarized in the Y direction.

Figure 14:
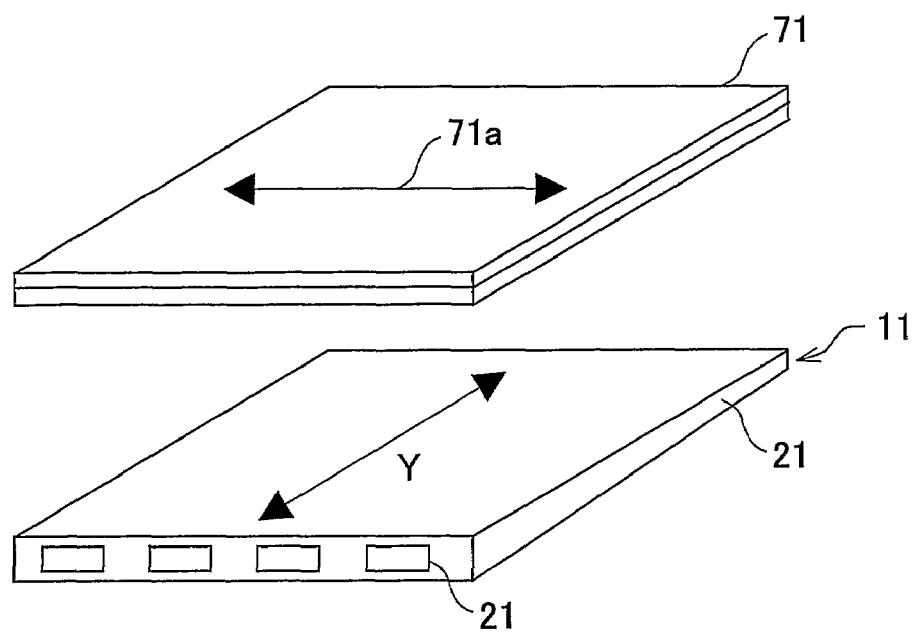
FIG. 14 shows a polarization axis (X direction) of planar light and a transmission axis of a polarization plate of a liquid crystal panel.
Figure 15:
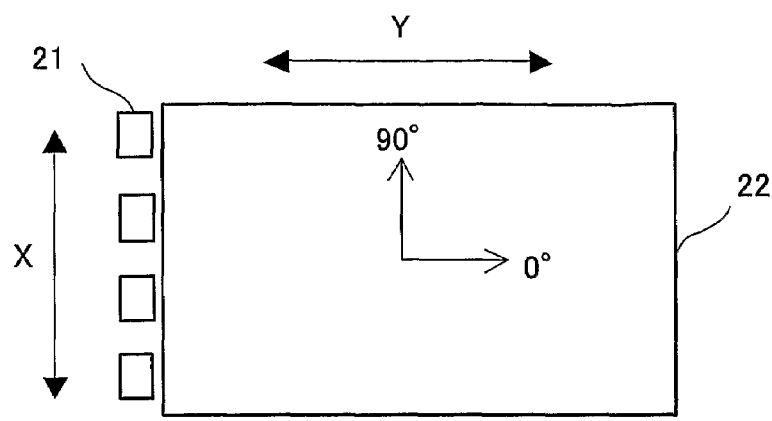
Figure 15:
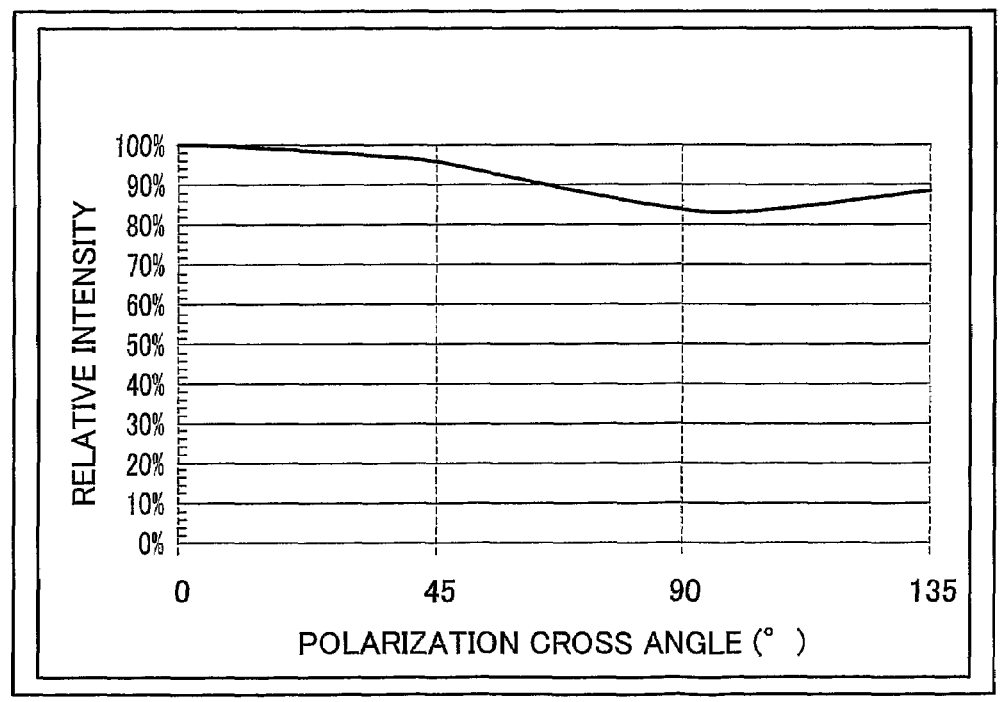

In the case above, an angle (polarization cross angle) between (i) a polarization axis (Y direction) of the planar light and (ii) a transmission axis 71a of a polarization plate 71 of the liquid crystal panel 12, both (i) and (ii) being illustrated in FIG. 14, is 0° when the transmission axis 71a is in parallel to the Y direction, while the angle is 90° when the transmission axis 71a is in parallel to the X direction in accordance with this angle, the (relative) intensity of the light emitted from the liquid crystal panel 12 varies, as shown in FIG. 15(b).

In this case, therefore, the aforesaid polarization cross angle is preferably in close proximity to 0°, in order to increase the intensity of light emitted from the liquid crystal panel 12 as much as possible.

Also, for instance, the polarization cross angle is preferably within the range of ±20°. This allows the intensity of emitted light to be about a few percent of the maximum value (in a case where the polarization cross angle is 0°), thereby making it possible to restrain the decrease of the intensity.

If the direction of the transmission axis 71a of the polarization plate 71 of the liquid crystal panel 12 cannot be easily brought near to the Y direction, it is preferable to insert a ½ wavelength plate (or another type of polarization rotation element) between the liquid crystal panel 12 and the backlight section 11. With this, the polarization axis of the light emitted from the backlight section 11 can be freely rotated (e.g. for 90°). This makes it easy to bring the direction of the transmission axis 71a near to the Y direction.

Now, how the lenticular lens array 31 provided in the liquid crystal panel 12 of the present display apparatus is manufactured will be described below.

FIGS. 16(a)-16(d) are cross sections for illustrating the manufacturing method of the lenticular lens array 31.

Figure 16:
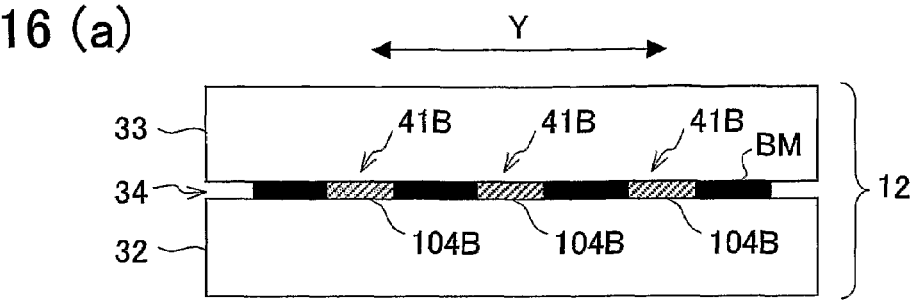
FIGS. 16(a)-16(d) are cross sections for illustrating how a lenticular lens 31 is manufactured.
Figure 16:
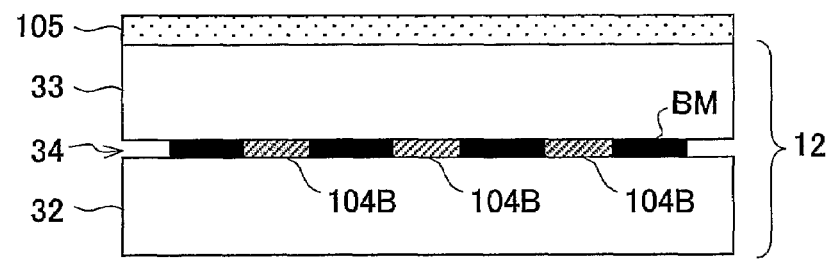
Figure 16:
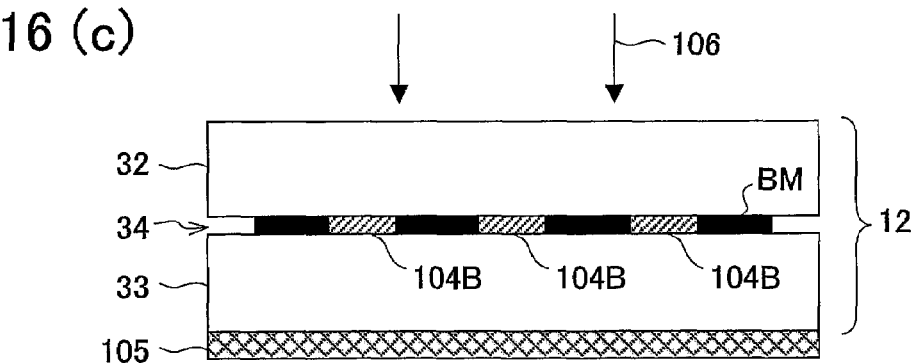
Figure 16:
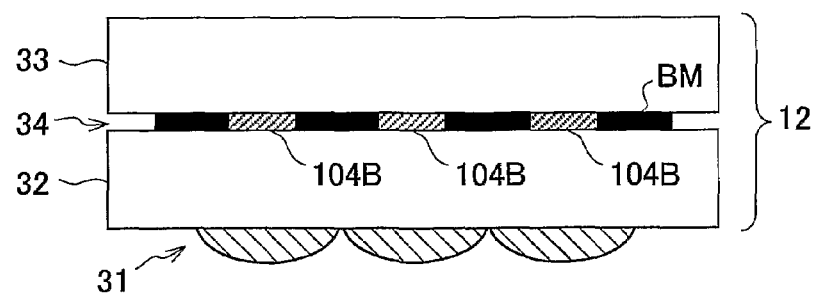

First, as shown in FIG. 16(a), a liquid crystal panel in which the liquid crystal layer 34 is sandwiched between the substrates 32 and 33 is prepared.

On the liquid crystal layer 34 side of the TFT substrate 33, the following circuit members are provided: pixel electrodes corresponding to pixels provided in a matrix manner; TFTs connected to the respective pixel electrodes; and a gate bus line, a source bus line and the like. It is noted that these members are not illustrated in the figure.

On the liquid crystal layer 34 side of the opposing substrate 32, meanwhile, R, G, and B color filters and an opposing electrode are provided in accordance with the positions of the pixels 41 in the liquid crystal layer 34. As FIG. 16(a) shows, in the Y direction, color filters 104B having a single color (B in FIG. 16(a)) are formed in line. Between these color filters, a light shielding layer BM (Black Matrix) is provided.

Note that, hereinafter, a pixel 41 on which a color filter 104B is formed is termed "pixel 41B".

As shown in FIG. 16(b), light-curing resin is applied to the surface of the TFT substrate 33 of the liquid crystal panel 12, so that a light-curing resin layer 105 is formed. This light-curing resin layer 105 is sensitive to the light with a wavelength of 380 nm to 420 nm.

Note that, in order to facilitate the adhesion properties between the light-curing resin layer 105 and the TFT substrate 33, the glass surface of the TFT substrate 33 is preferably reformed by, for instance, applying a silane coupling agent on the glass surface, before applying the light-curing resin.

Then, as FIG. 16(c) illustrates, from the opposing substrate 32 side, light 106 (within the wavelength range between 380 nm and 420 nm) for exposure is applied in a scanning manner. The light-curing resin layer 105 is therefore exposed to this light 106. This exposure is conducted in such a manner as to form an exposed part that has a large curvature in the Y direction in line with each pixel 41 but has no curvature in the X direction. (This exposure step will be described below.)

Subsequently, as shown in FIG. 16(d), the light-curing resin layer 105 having been exposed to the light is developed, so that a non-cured part (i.e. a part not exposed to the light) is removed. This results in the formation of the lenticular lens array 31 (developing step).

After the developing step, it is preferable that the curing of the light-curing resin be further precipitated by applying the light 106 to the lenticular lens array 31, in order to cause the resin to be nearly perfectly cured. On this occasion, heat curing may be carried out concurrently with the light curing.

The following will describe the above-mentioned exposure step in detail.

Figure 17:
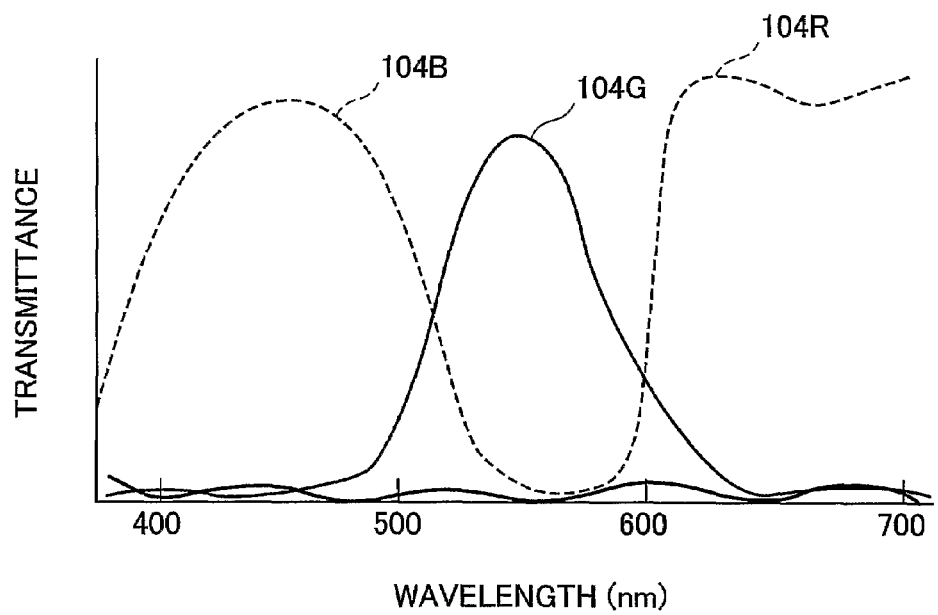
FIG. 17 is a graph showing the spectral transmittance characteristics of a color filter.

FIG. 17 is a graph showing the spectral transmittance characteristics of the color filters 104R, 104G, and 104B. It is noted that the color filters 104R and 104G are red and green color filters, respectively. As the figure shows, the color filters 104R and 104G hardly allow light with an wavelength of around 400 nm to pass through.

In the meanwhile, as described above, the light-curing resin layer 105 is a photosensitive material layer sensitive to light with an wavelength of 380 to 420 nm, and the light 106 therefore has this wavelength range. On this account, such light 106 cannot pass through the pixels 41R and 41G, and only can pass through the pixel 41B.

Figure 19:
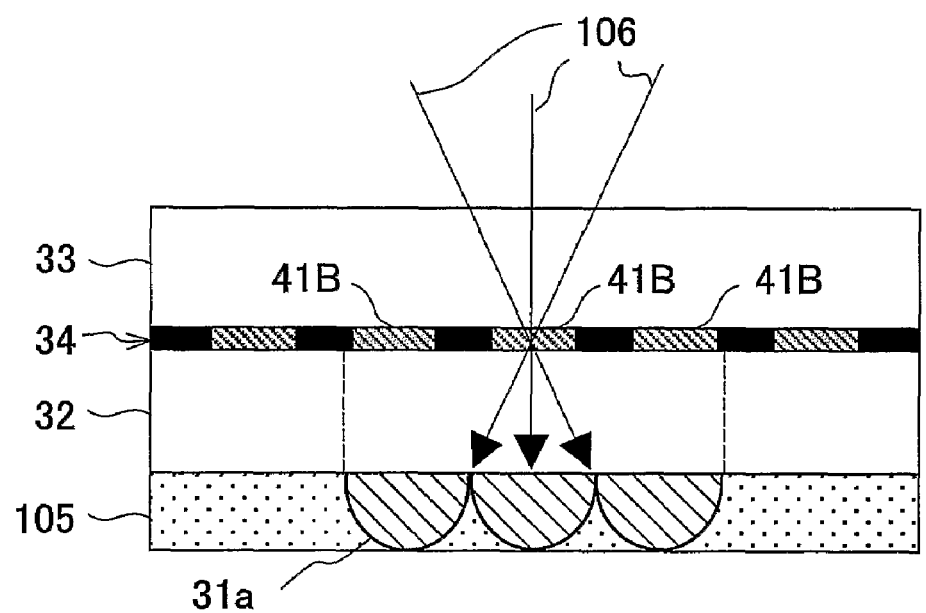
FIG. 19 illustrates an exposure step in manufacturing of the lenticular lens.

In the exposure step, as shown in FIG. 19, the incident angle of the light having passed through the pixel 41B is altered, the light-curing resin on the pixels 41R and 41G is exposed to the light, and consequently the lenticular lens array 31 is formed on the entirety of the display area of the TFT substrate 33.

The following describes why the light-curing resin layer 105 made of the aforesaid material is used. A photosensitive material typically absorbs light to which the material is sensitive. On this account, in a case where the lenticular lens array 31 is made of a photosensitive material sensitive to red light or green light, the lenticular lens array 31 absorbs a part of red or green light. This deteriorates color reproducibility of the display.

Also, in a case where the lenticular lens array 31 is made of a photosensitive material sensitive to blue light (with an wavelength of 380 to 420 nm), a part of blue light is absorbed by the lenticular lens array 31. This, however, does not significantly influence on the color reproducibility.

Figure 18:
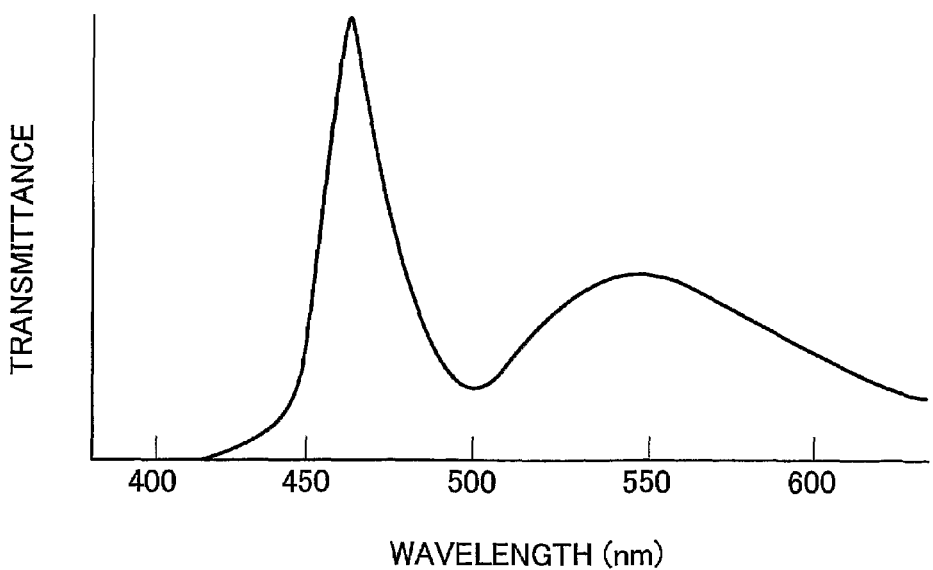
FIG. 18 is a graph showing the emission spectrum of an LED light source.

In particular, for instance, in a case of an LED light source used as a light source of a backlight of a liquid crystal display apparatus such as a mobile phone, a PDA, and a digital still camera, the emission spectrum is around 420 mm or longer, as shown in FIG. 18. If such a light source is adopted, it is possible to effectively restrain the degradation of the color reproducibility, by adopting the lenticular lens array 31 made of a photosensitive resin sensitive to light with an wavelength of 380 to 420 nm.

Note that, in general, there are almost no color filters (colorants and pigments) allowing light with an wavelength of less than 380 nm (i.e. ultraviolet light) to pass through. To use ultraviolet light, therefore, the light must be applied before forming the color filters, as described above.

The micro lens array such as the lenticular lens array 31 may be manufactured in the following manner.

FIGS. 20(a)-20(c) and 21(a)-21(c) illustrate (two types of) methods of manufacturing an opposing substrate having micro lenses (i.e. opposing substrate with lenses).

It is noted that the micro lens array is a group of micro lenses that are aligned in order.

Figure 20:
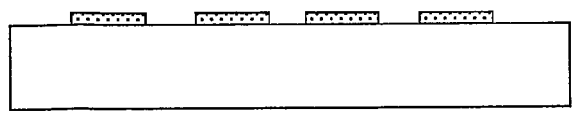
FIGS. 20(a)-20(c) illustrate a method of manufacturing an opposing substrate having micro lenses (i.e. opposing substrate with lenses).
Figure 20:
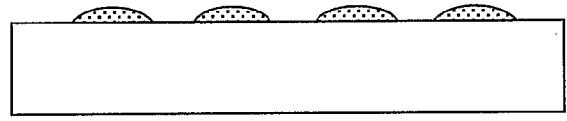
Figure 20:
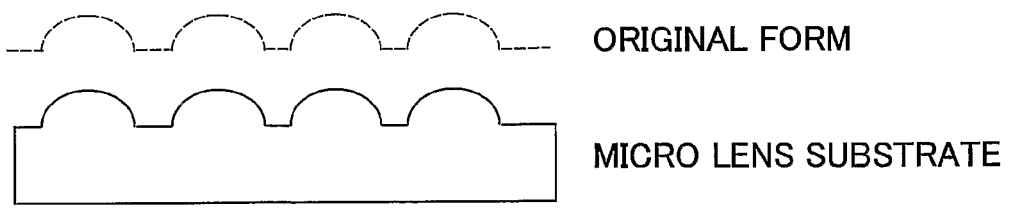

A first manufacturing method shown in FIGS. 20(a)-20(c) includes the following steps (1-1) through (1-3).

(1-1) A photoresist layer on a glass substrate is patterned (FIG. 20(a)).

(1-2) The patterned resist layer is heated so as to melt, and as a result a resist layer in the form of micro lenses is formed (FIG. 20(b)). This photoresist can be used as micro lenses, in a case where transparent photoresist is used.

(1-3) In conjunction with the micro-lenses-shaped resist layer, the glass substrate is subjected to dry etching. With this, the form of the resist layer is etched back to the glass substrate, and consequently a micro lens array substrate is formed (FIG. 20(c)).

Figure 21:
FIGS. 21(a)-21(c) illustrate another method of manufacturing an opposing substrate having micro lenses (i.e. opposing substrate with lenses).
Figure 21:
Figure 21:
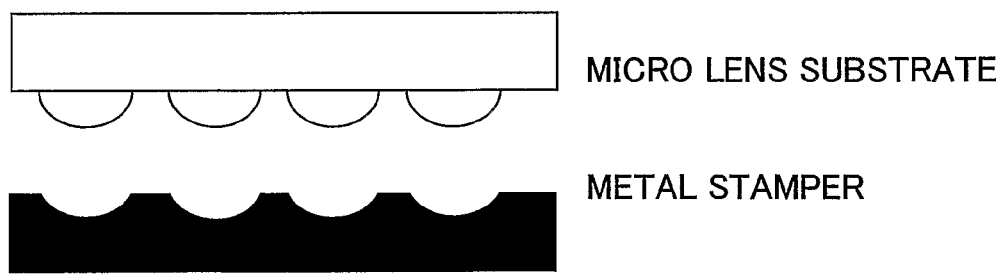

A second manufacturing method shown in FIGS. 21(a)-21(c) includes the following steps (2-1) through (2-3).

(2-1) A photoresist layer on a glass substrate is patterned by means of, for instance, electron beam exposure, so that a resist layer in the shape of micro lenses is formed. This resist layer is used as a master mold. (FIG. 21(a))

(2-2) Using the master mold, a metal stamper is formed by means of, for instance, plating (FIG. 21(b)).

(2-3) With this metal stamper, the form of micro lenses is transferred to the glass substrate, so that a micro lens array substrate is formed (FIG. 21(c)).

Figure 22:
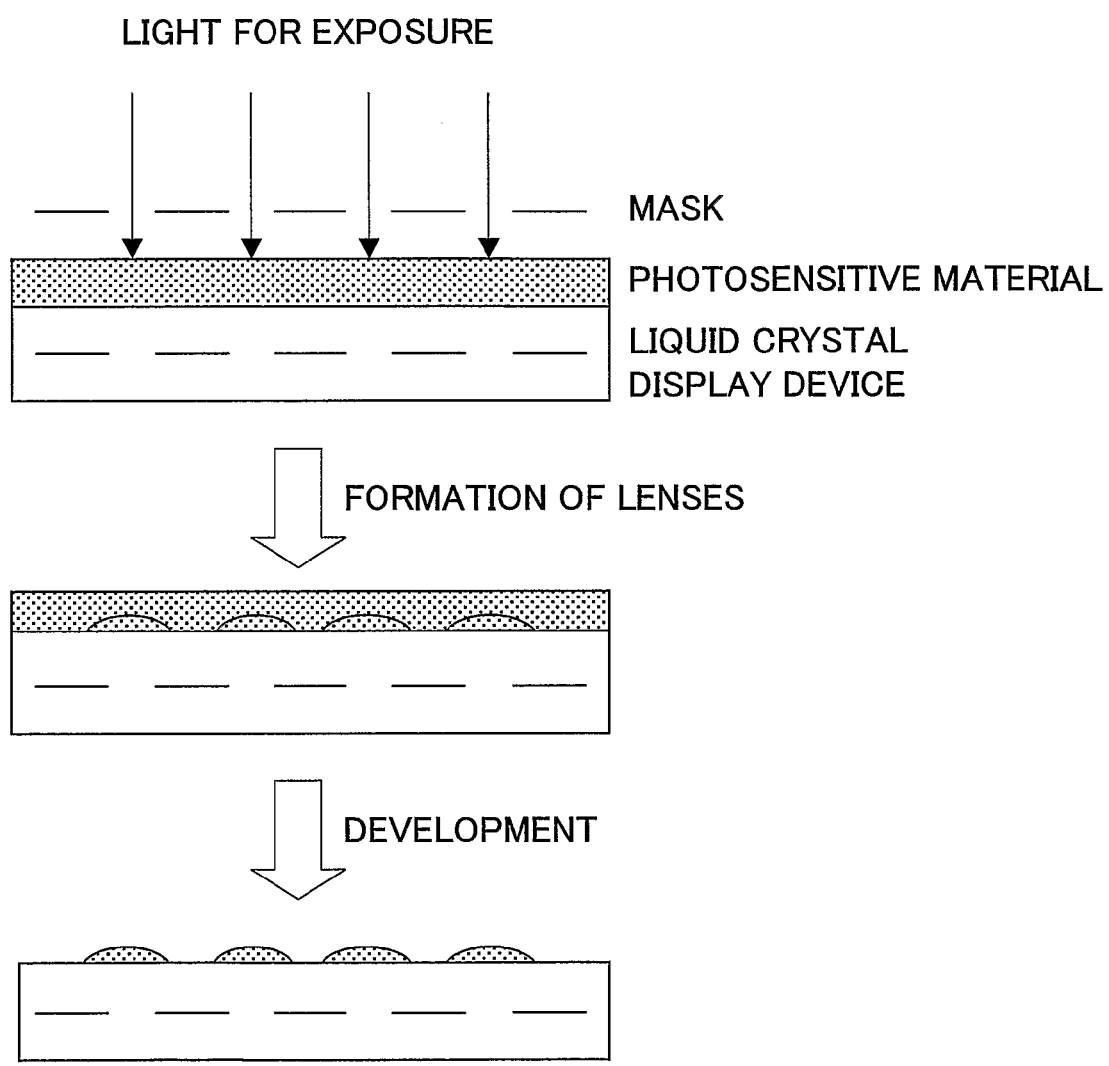
FIG. 22 illustrates a further method of manufacturing an opposing substrate having micro lenses (i.e. opposing substrate with lenses).

Alternatively, micro lenses may be formed in such a manner that a photosensitive material is applied to the surface of a liquid crystal display device, and exposure through a mask is carried out as shown in FIG. 22.

In the present embodiment, the pixels 41 on the display panel 21 are aligned along the X and Y directions.

Alternatively, the direction along which the directivity of the light emitted from the backlight is reduced may be in line with the direction along which the pitch between the pixels is relatively short (e.g. in a K direction). In such a case, the pixel pitch in the direction orthogonal to the K direction (i.e. in a L direction) is preferably longer than the pixel pitch in the K direction. In this case, both the viewing angle and the frontal brightness of the present display apparatus are improved by increasing, in the L direction, the directivity of the light emitted from the backlight.

On this account, it is possible to rephrase the display apparatus of the present invention as follows: the display apparatus of the present invention, which reproduces an image by applying light from a backlight to a display panel and controlling light transmittance states of pixels provided, on the display panel, in a matrix manner, is arranged such that the display panel includes a micro lens array including a group of micro lenses corresponding to the pixels, a pitch of the pixels on the display panel in the first direction is longer than a pitch of the pixels in the second direction, and a directivity of the light traveling in the first direction is higher than a directivity of the light traveling in the second direction.

As described above, the display apparatus of the present invention (i.e. present display apparatus), which reproduces an image by applying light from a backlight to a display panel and controlling light transmittance states of pixels provided, on the display panel, in a matrix manner, is characterized in that the display panel includes a micro lens array including a group of micro lenses corresponding to the pixels, the pixels on the display panel are disposed in a matrix manner and along a first direction and a second direction orthogonal to the first direction, and a pitch of the pixels in the first direction is longer than a pitch of the pixels in the second direction, and a directivity of the light traveling in the first direction is higher than a directivity of the light traveling in the second direction.

The present display apparatus is a non-self-luminous display apparatus that reproduces images by utilizing light emitted from a backlight that is an internal light source.

That is, in the present display apparatus, the light emitted from the backlight is applied to a display panel including pixels orderly disposed in a matrix manner, and a drive signal (drive voltage) corresponding to an image (including texts) to be displayed is separately applied to each pixel.

With this, the transmittance of each pixel on the display panel is varied, so that the intensity of the display light is partially modulated. This arrangement enables the display panel to reproduce an image thereon.

In the present display apparatus, provided that the arranging directions of the pixels on the display panel are a first direction and a second direction (orthogonal to the first direction), the pitch of the pixels in one direction (hereinafter, first direction) is longer than the pitch of the pixels in the second direction.

In particular, the present display apparatus is arranged in such a manner that, to the display panel, the backlight applies light whose directivity in the first direction is higher than the directivity in the second direction.

It is noted that the directivity indicates to what extent the light emitted from the backlight section to the display panel is oriented to a particular direction. This directivity of light can be expressed in an intensity half-width angle (an angle with which the intensity is half as much as the maximum value) in the intensity distribution (light distribution) of the emitted light. The narrower the half-width angle is, the higher the directivity is and the more the light resembles parallel light (described later).

On the surface on the side of receiving the light from the backlight, the display panel of the present display apparatus is provided with a micro lens array including a plurality of micro lenses. Each micro lens is designed so as to have a focal point at around the pixels of the display panel.

The focal point of the micro lens is a point where the width of the outgoing light is minimized (i.e. a point where the beam waist is minimized), when parallel light enters the micro lens. The parallel light is light traveling in the direction orthogonal to the surface of the micro lens (i.e. the surface of the display panel).

In the present display apparatus, therefore, the parallel light entering the micro lens is refracted in such a manner as to focuses on around the pixels. After passing through the pixels, the light spreads so as to widen the directivity (viewing angle) thereof.

The collection of light by the micro lenses is particularly effective in a case where the pitch of the pixels is long. That is to say, in the second direction along which the pitch of the pixels is shorter than the pitch in the first direction, the converging angle of the micro lens is small, and hence the collection of light is not effective in this direction.

In the present display apparatus, in the first direction along which the micro lenses are effective (i.e. the pitch of the pixels is long), the directivity of the light emitted from the backlight is increased so that the light is brought near to parallel light. After passing through the pixels, the light is caused to spread by the micro lenses.

In the meanwhile, in the second direction along which the micro lenses are not effective (i.e. the pitch of the pixels is short), the directivity of the light emitted from the backlight is kept low (i.e. a spread angle is set to large), so that the viewing angle of the light is widened before reaching the micro lenses.

With the arrangement above, the viewing angle of the display panel of the present display apparatus is wide in both the first and second directions.

In the present display apparatus, the frontal brightness is improved by increasing, in the first direction, the directivity of the light emitted from the backlight. Also, thanks to this increase in directivity, light that has been blocked by the BM and the like is collected by the micro lenses and passes through pixel apertures (parts of the pixels where light can pass through), so that an amount of light that can pass through the pixels is increased.

On this account, in the present display apparatus, the frontal brightness of the display panel is better than that of a conventional display apparatus in which the directivity of the light emitted from the backlight is low. Also, among sets of light collected by the micro lenses, the light entering around the end of the micro lenses is refracted by the micro lenses and collected. On this account, in the present display apparatus, the brightness is improved in a wide range of viewing angles (directivities).

If the micro lenses are not provided in the present display apparatus, the brightness in the frontal direction is still improved because the directivity of the light emitted from the back light is high in the first direction. However, in the first direction, the viewing angle of the display panel is very narrow.

In the present display apparatus, it is preferable that an intensity-half-width angle of the light traveling in the first direction be not more than ±20°.

Light emitted from the backlight (i.e. light whose directivity is not enhanced) typically has an intensity-half-width angle in a range between ±20° and ±30°. For this reason, in the direction along which the directivity of light is ±20° or less, the directivity of light is preferably widened by the micro lenses.

When the display panel supports color image reproduction, the display panel has rows of different types of pixels (e.g. R, G, and B). In this case, since the pitch of the pixels is short along the arranging direction of the rows, the arranging direction of the rows is preferably set as the second direction.

As the aforesaid micro lens array, a lenticular lens array may be adopted. This lenticular lens array includes a plurality of lenticular lenses that are micro lenses each can collect light traveling in one direction.

The lenticular lens is superior to a micro lens that can collect light traveling in more than one direction, in terms of manufacturing easiness and costs. It is therefore possible to restrain the manufacturing costs of the present display apparatus, by adopting the lenticular lenses.

Note that, when the lenticular lenses are adopted, the direction of collecting light by the lenticular lens is preferably in parallel to the aforesaid first direction.

In the present display apparatus, in the first direction, a converging angle of each of the micro lenses is preferably within a range between 20° and 30°. With this, the viewing angle of the display panel is suitably set.

Provided that the diameter of the lens in the direction of collecting light along the longitudinal direction of the pixel pitch is D and the focal distance is f, the converging angle θ of the micro lens can be expressed by the following equation:

$$\theta = \tan^{-1}(D/(2 \times f))$$

The micro lens array is typically provided on the glass substrate of the display panel. On this account, the light having passed through the micro lens then passes through the glass (whose refractive index is n). In this case, the converging angle is expressed as follows:

$$\theta = \tan^{-1}(D \cdot n/(2 \times f))$$

(in this equation, f indicates the focal distance, of the micro lens, in the glass)

In the present display apparatus, the focal point of the micro lens is at around the pixels of the display panel. More specifically, the deviation between the focal point of the micro lens and the pixels is preferably in a range of not more than one third of the distance between the micro lens and the pixels. If the aforesaid deviation is within this range, a significant degradation of the frontal brightness of the present display apparatus can be prevented.

The focal point of the micro lens is preferably closer to the micro lens than to the pixels, while the deviation is in the aforesaid range. With this, the viewing angle of the display panel (present display apparatus) can be widened in the aforesaid direction while the thickness of the glass substrate is kept at a certain level, so that the directivity and the strength of the glass are both achieved.

The micro lenses of the present display apparatus may be manufactured by the following steps (a)-(c):

(a) the step of applying photosensitive resin, which is a material of the micro lenses, to a surface of the display panel, the surface being on a backlight side;

(b) the step of exposing the photosensitive resin material to light, through pixel apertures of the display panel; and (c) the step of developing the photosensitive resin material that has been subjected to exposure.

In this manner, the lenses can be easily manufactured with low costs, by means of self-alignment by utilizing pixels. This results in the decrease of the manufacturing costs of the present display apparatus.

In the present display apparatus, in the first and second directions, intensity-half-width angles of the light emitted from the backlight may be set to a relatively small value (not more than ±20°).

In this case, the light emitted from the backlight has high directivities both in the first and second directions. This narrows the viewing angle in the second direction along which the converging angle of the micro lens is narrow.

In a case where the above-described arrangement is adopted to a mobile phone, the directivity in the vertical direction can be widened while the viewing angle in the horizontal direction is kept narrow. This arrangement is useful for preventing a person other than the user from viewing the image displayed on the display panel. (While the user of the mobile phone can view the image, a person next to the user cannot easily peek at the image.)

Furthermore, since the directivities of the light emitted from the backlight are increased in two directions, an amount of light that travels in the frontal direction and can pass through the pixels can be further increased. This further improves the frontal brightness of the present display apparatus.

The display panel is typically provided with a linear polarization plate. Meanwhile, a type of light emitted from the backlight is linearly polarized (in other words, a linearly-polarized component of the light emitted from the backlight is large in a particular direction). In such a case, the main polarization direction (aforesaid particular direction) of the light entering the linear polarization plate is preferably arranged so as to be in parallel to the transmission axis of the polarization plate. This further improves the display brightness of the present display apparatus.

More specifically, a polarization cross angle between the transmission axis of the linear polarization plate and the main polarization direction is preferably not more than a range of ±20°.

This restrains the decrease in the intensity of emitted light to be about a few percent of the maximum value (in a case where the polarization cross angle is 0°). Furthermore, the main polarization direction of the light emitted from the backlight may be in parallel to the second direction.

The main polarization direction of the light entering the linear polarization plate can be made in parallel to the transmission axis of the polarization plate, by either adjusting the relative locations of the linear polarization plate and the backlight or inserting a ½ wavelength plate (or another type of polarization rotation element) between the liquid crystal panel and the backlight.

Using the polarization rotation element, the main polarization direction of the light emitted from the backlight can be rotated in a desired direction. This makes it easy to bring the main polarization direction to be near to the direction of the transmission axis of the linear polarization plate.

When a liquid crystal panel is adopted as the display panel of the present display apparatus, the present display apparatus can act as a liquid crystal display apparatus whose frontal brightness is high and viewing angle is wide.

Such a liquid crystal display apparatus can be suitably adopted as a display screen of an electronic device such as a mobile phone, a PDA (Personal Digital Assistant), a digital camera, a liquid crystal display unit, and a liquid crystal television set.

In a case of a liquid crystal panel in which micro lenses are formed by bonding, on the display-panel-side surface of the backlight section emitting light to the display panel, a polarization plate that allows linearly polarized light emitted from the backlight and vibrating in one direction to pass through, the lens sections of the respective micro lenses are buried under an adhesive applied to the polarization plate, when the polarization plate is bonded with the glass substrate, so that it is difficult to simply bond the backlight section with the glass substrate. On this account, optical loss occurs due to the reflection on the surfaces of the micro lenses. However, if, for instance, the polarization plate is bonded with the surface of a prism sheet used for the backlight, the reflection on the prism sheet decreases, and hence the aforesaid optical loss can be stopped.

The display apparatus of the present invention, which reproduces an image by applying light from a backlight to a display panel and controlling light transmittance states of pixels provided, on the display panel, in a matrix manner, may be arranged such that, the display panel includes a micro lens array including a group of micro lenses corresponding to the pixels, the pixels on the display panel are disposed in a matrix manner and along a first direction and a second direction orthogonal to the first direction, and a pitch of the pixels in the first direction is longer than a pitch of the pixels in the second direction, the pixels on the display panel are disposed in a matrix manner and along a first direction and a second direction orthogonal to the first direction, a pitch of the pixels in the first direction is longer than a pitch of the pixels in the second direction, an intensity-half-width angle of the light is not more than ±20° in the first direction and the second direction, and the light traveling in the first direction is collected by the micro lens array.

In this case, the light emitted from the back light has high directivities both in the first direction and the second direction. On this account, the viewing angle in the second direction along which the converging angle of the micro lens is narrow can be narrowed.

Therefore, for instance, when this arrangement is adopted to a mobile phone, it is possible to widen the viewing angle in the vertical direction, while the viewing angle in the horizontal direction is kept narrow. This arrangement is useful for preventing a person other than the user from viewing the image displayed on the display panel. (While the user of the mobile phone can view the image, a person next to the user cannot easily peek at the image.)

Furthermore, since the directivities of the light emitted from the backlight are increased in two directions, an amount of light that travels in the frontal direction and can pass through the pixels can be further increased. This further improves the frontal brightness of the present display apparatus.

The description above may be rephrased as follows: in the backlight section 11, the light emitted from the light source (LEDs 21) repeatedly total-reflects and propagates through the optical waveguide 22, and the light incident on microdots MD provided on the light-emitting side is mainly emitted from the optical waveguide 22.

The present invention may be rephrased as the following first to twelfth image display apparatuses. The first image display apparatus includes: a planar light source including light sources and an optical waveguide that propagates the light emitted from the light sources and causes the light to go outside from an optical outgoing surface; an image display device on which images are displayed by modulating the light exiting the optical outgoing surface of the optical waveguide; micro lenses that are provided on the planar light source side of the image display device and concentrate light on pixel apertures of the image display device, the pixel apertures corresponding to the micro lenses, the first image display apparatus being arranged such that, the directivities of the light emitted from the planar light source are different between (i) the arranging direction of multi-color pixels of the image display device and (ii) the direction orthogonal to the direction (i), and the directivity in the direction (ii) is higher than the directivity in the direction (i).

In general, a direct-view liquid crystal display device in which pixels corresponding to R, G, and B (i.e. RGB pixels) are disposed in a stripe manner is arranged such that three pixels corresponding to R, G, and B are counted as one group, in the arranging direction of these pixels (41), as shown in FIG. 3. For this reason, the pitch (x) of the groups of these pixels is identical with the pitch (y) of the pixels in the direction orthogonal to the arranging direction of the pixels. Therefore, the pixel pitch in the arranging direction of the RGB pixels is one third of the pixel pitch (y) in the direction orthogonal to the arranging direction of the RGB pixels. Also when the pixels are disposed in a deltaic manner, the pitch of the pixels in the arranging direction of the RGB pixels is shorter than the pitch of the pixels in the direction orthogonal to the arranging direction of the RGB pixels.

When a micro lens is provided on each of these pixels, the lens has a rectangular shape (i.e. the lens has a longer side in the direction orthogonal to the arranging direction of the pixels), so that the converging angle in the Y direction shown in FIG. 3 is wider than the converging angle in the X direction. Therefore, in the Y direction, the light having passed through the pixel apertures spreads with the same converging angle. Meanwhile, since the converging angle of the micro lens is narrow in the X direction, the spread angle is not wide even after the light passes through the pixel apertures. This indicates that, while the micro lens widens the directivity (viewing angle) in the Y direction, the micro lens does not widen the directivity (viewing angle) in the X direction. The directivity of the light from the light sources is therefore increased in the Y direction and widened in the X direction. With this, the directivity of the light in the X direction is narrowed down (increased) so that the frontal brightness of the backlight is improved, while the directivity (viewing angle), in the Y direction, of the light having passed through the liquid crystal display device is widened without significantly decreasing the frontal brightness. While the effect of the widening of the directivity (viewing angle) on account of the micro lens is not significant in the X direction, the directivity of the incoming light is wide in the X direction. For this reason, since the light having passed through the liquid crystal display device has a wide directivity (viewing angle) in all directions, an image with very high quality (i.e. bright and has a wide viewing angle) is realized.

The second image display apparatus is identical with the first image display apparatus, except that the light sources are disposed in parallel to the arranging direction of the multi-color pixels of the image display device. For instance, in a side-light-type backlight of Document 4, the directivities of outgoing light are different between (i) the direction of the propagation of the light and (ii) the direction orthogonal to the direction (i). As FIG. 6(*b*) schematically illustrates, in the backlight section 11, a plurality of LEDs 21 are disposed in line along one side (incoming end face) of the optical waveguide 22. Instead of the LEDs 21, a cold-cathode tube may be adopted. Also, LEDs or a cold-cathode tube may be provided on the both sides of the optical waveguide 22. The light emitted from the LEDs 21 and enter the optical waveguide 22 from the incoming end face of the optical waveguide 22 propagates through the optical waveguide 22 in the Y direction, and emitted from the outgoing surface (in parallel to the figure) to the display panel. Subsequently, the light is total-reflected in the prism sheet (prism array) 24, and emitted toward the liquid crystal panel 12.

As shown in FIG. 7, this backlight section 11 has a wide directivity in the arranging direction of the light sources whilst has a high directivity in the direction orthogonal to the arranging direction of the light sources. For this reason, as described in relation to the effect of the first image display apparatus, if the direction along which the directivity is wide is caused to be in parallel to the arranging direction of the RGB pixels (pixels 41), a wide directivity (viewing angle) is obtained in all directions on account of the micro lenses (lenticular lens array 31), so that an image with a very high quality (bright and has a wide viewing angle) is realized.

The third image display apparatus is identical with the first image display apparatus, except that the light sources are disposed in a direction orthogonal to the arranging direction of the multi-color pixels of the image display device. For instance, in a side-light-type backlight of Document 3, the directivities of outgoing light are different between (i) the direction of the propagation of the light and (ii) the direction orthogonal to the direction (i).

In the side-light-type backlight, an apex part of the prism or lens array is caused to be in touch with the light-emitting side of the optical waveguide, and light is obtained from the point of contact. Therefore, as shown in FIGS. 10(*a*)-10(*c*), the directivity is high in the arranging direction of the light sources (i.e. in the Y direction), while the directivity is wide in the direction orthogonal to the arranging direction (i.e. in the X direction). As described in relation to the effect of the first image display apparatus, if the direction along which the directivity is wide is caused to be in parallel to the arranging direction of the RGB pixels, a wide directivity (viewing angle) is obtained in all directions on account of the micro lenses (lenticular lens array 31), so that an image with a very high quality (bright and has a wide viewing angle) is realized. Note that the light sources may be a narrow cold-cathode tube or a xenon tube. Also, as the light sources, a prism or a lens whose refractive index is at least partly matched is provided on a light-emitting section of the optical waveguide.

The fourth image display apparatus is identical with any one of the first to third image display apparatuses, except that the micro lens is a lenticular lens that collects light only in one direction, and the longitudinal direction of the lenticular lens is in parallel to the arranging direction of the multi-color pixels. As described in relation to the effect of the first image display apparatus, even if a micro lens that can collect light in both the Y and X directions is adopted, it is not possible by the micro lens to widen the directivity in the arranging direction of the RGB pixels. Therefore, the effect in this case is almost identical with the case of adopting the lenticular lens that collects light only in the direction orthogonal to the arranging direction of the RGB pixels. Also, adopting the lenticular lens makes it easy to manufacture the lens and reduce the costs.

The fifth image display apparatus is identical with any one of the first to fourth image display apparatuses, except that at least one direction of collecting light by the micro lens is in the range of $20° \leq \tan^{-1}(D/(2\times f)) \leq 30°$, provided that the diameter of the micro lens in the direction of collecting light along the longitudinal direction of the pixel pitch is D and the focal distance is f. Note that, if the focal distance f of the micro lens is defined as a distance in the glass, f must be divided by a refractive index n of the glass. A typical backlight system is adjusted by (i) an optical waveguide that includes spread sections that are distant from each other in a manner that equalizes sets of outgoing light exiting the optical outgoing face and (ii) two prisms that are orthogonal to a spread plate adjusting the directivity of the outgoing light, and the directivity (viewing angle) of the light after passing through the liquid crystal display device is in a range of around ±20' and ±30° in all directions. If the directivity is higher than the aforesaid range in order to increase the brightness in the frontal direction, the viewing angle of the liquid crystal display apparatus is narrowed. On the contrary, if the directivity is wider than the aforesaid range, the viewing angle of the liquid crystal display apparatus also widens but the brightness decreases. In this manner, both of these cases are impractical. In a similar reason, also when micro lenses are adopted, the lenses are preferably adjusted in such a manner as to keep the directivity of the light to be within the aforesaid range with which the brightness and the viewing angle are balanced.

The converging angle (spread angle of light) of a micro lens is determined in accordance with the diameter D of the lens and the focal distance f of the lens (the focal point is typically set at pixel apertures). FIG. 9 indicates the relationship between the converging angle and the directivity (half-width angle) of the micro lens. The directivity is kept within the aforesaid range, if the converging angle $\tan^{-1}(D/2f)$ is within a range of ±20° and ±30° (note that, although this range is more or less accurate, a small deviation occurs on account of reasons such as the shape of the pixel apertures). It is noted that the directivity indicates to what extent the light emitted from a lighting system is oriented to a particular direction. For instance, the aforesaid range is expressed in an intensity half-width angle in the intensity distribution (light distribution) of the emitted light. The narrower the half-width angle is, the higher the directivity is. The focal point is not a point of light collection by means of paraxial focus but is a point where the beam waist of light collected by the micro lens is minimized. If, even if the light enters the lens from the backlight, it is indeterminable where the beam waist is, the focal point is set at a point where the beam waist is minimized when parallel light enters the micro lens.

The sixth image display apparatus is identical with any one of the first to fourth image display apparatus, except that the focal point (where the beam waist is minimized) of the micro lens is closer to the micro lens than to the pixel apertures of the image display device. A pixel pitch of a liquid crystal device currently adopted to mobile phones, PDAs, digital cameras and the like is typically in a range of 100-200 µm. When micro lenses are provided on a panel having the aforesaid pixel pitch and the focal point of the micro lens is designed so as to locate substantially at the pixel apertures, as the equation below indicates, the thickness of the glass substrate on the micro lens side of the liquid crystal display device is preferably about 200 µm in a case where a panel with a pixel pitch of 150 µm is adopted, even if the directivity is estimated to be the narrowest (20°).

Converging Angle=$\tan^{-1}D/2f$=$\tan^{-1}(150$ (pitch)×1.52 (refractive index of glass)/(2×300 (thickness of glass substrate)))=20

As a matter of course, the thinner the glass substrate is, the lower the strength of the glass is. Glass with low strength induces a problem of handling during the step of manufacturing the liquid crystal display device, and lack of endurance against an external force exerted in a practical use. For this reason, as Document 1 describes, the focal distance of the micro lens is set in such a manner as to cause the focal point of the micro lens to be closer to the micro lens than to the pixel apertures. With this, only the converging angle of the micro lens is widened and a certain level of thickness of the glass substrate is maintained, so that both the directivity and the strength of the glass can be achieved.

The seventh image display apparatus is manufactured by a micro lens forming method (with which a micro lens is formed by means of self-alignment by utilizing pixel apertures) disclosed by Document 3. By means of the self-alignment, a lenticular lens described in relation to the effect of the fourth image forming apparatus, which collects light only in the direction orthogonal to the arranging direction of the RGB pixels, can be easily manufactured. The self-alignment is therefore particularly suitable for manufacturing the lenticular lens, and contributes to the cost cutting.

The eighth image display apparatus includes: a backlight from which light having high directivities both in the arranging direction of the RGB pixels and in the direction orthogonal to the arranging direction is emitted; and one of the first to seventh image display apparatus. When the present invention is adopted to, for instance, a mobile phone on which confidential information is often displayed, the directivity in the vertical direction can be widened while the directivity in the horizontal direction is kept narrow. This still allows the user to properly view the display but a person next to the user cannot easily peek at the display. Moreover, since the directivity of the light emitted from the backlight is improved in all directions, the frontal brightness of the backlight is further increased, and hence a high-intensity display will be realized.

The ninth image display apparatus is identical with the first image display apparatus, except that the light emitted from the planar light source is polarization-dependent, and linearly polarized light, which is in the direction along which an amount of light is relatively large, can pass through a polarization plate provided on the light incident side of the image display device. With this, the efficiency of the use of the light emitted from the backlight is further increased, so that the image display device that can emit bright light is obtained. The tenth image display apparatus is identical with the ninth image display apparatus, except that the polarization plate on the light incident side of the image display device allows most of linearly polarized light, which vibrates in the direction orthogonal to the arranging direction of the multi-color pixels, to pass through. A backlight disclosed by Document 2 is polarization-dependent in a manner shown in FIGS. 15(a) and 15(b). The efficiency of the use of the light improves if the polarization plate is designed in line with this characteristic of the backlight, and consequently an image display device that can display a bright image is obtained.

The eleventh image display apparatus is identical with the tenth image display apparatus, except that a permissible range of the aforesaid angle is not more than ±20°. The twelfth image display apparatus is identical with the tenth image display apparatus, except that a polarization rotation element (½ wavelength plate) that changes the polarization direction is provided between the planar light source and the polarization plate, and the polarization axis of linearly polarized light is rotated in such a manner as to allow linearly polarized light, which is in the direction along which an amount of light is relatively large, to pass through the polarization plate. The linearly polarized light is rotated by the wavelength plate when the transmission axis of the polarization plate is not in parallel to the axis of the linearly polarized light that is in the direction along which an amount of light is relatively large. With this, the efficiency of the use of light emitted from the backlight improves, and consequently an image display device that can reproduce a bright image is obtained.

In the present embodiment, the micro lenses are provided on the TFT substrate 33 side. Alternatively, the micro lenses may be provided on the opposing substrate 32 side.

In a case of a liquid crystal panel that does not include micro lenses, it is generally possible to attach a polarization plate to a glass substrate. On the other hand, it is difficult to attach the polarization plate to the glass substrate, when micro lenses are formed in the liquid crystal panel.

On this account, the polarization plate on the micro lens side may be attached to a prism sheet 24 used for the backlight section 11. This increases the reflection on the surfaces of the micro lenses, but at the same time the reflection on the prism sheet decreases, and hence the optical loss due to the surface reflection can be stopped.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The invention is useful for an apparatus including a non-self-luminous display panel such as a liquid crystal panel, an electrochromic display panel, an electrophoretic display panel, toner display panel, and a PLZT panel.

The invention claimed is:

1. A display apparatus that reproduces an image by applying light from a backlight to a display panel and controlling light transmittance states of pixels provided, on the display panel, in a matrix manner, wherein, the display panel includes a micro lens array, provided on the display panel so as to face the backlight, which includes a group of micro lenses corresponding to the pixels, the pixels on the display panel are disposed in a matrix manner and along a first direction and a second direction orthogonal to the first direction, and a pitch of the pixels in the first direction is longer than a pitch of the pixels in the second direction, and the backlight irradiates the micro lens array with light that is higher in directivity at an angle of irradiation along the first direction than at an angle of irradiation along the second direction.

2. The display apparatus as defined in claim 1, wherein, an intensity-half-width angle of the light traveling in the first direction is not more than ±20°.

3. The display apparatus as defined in claim 1, wherein, the micro lenses are lenticular lenses each collecting light traveling in the first direction.

4. The display apparatus as defined in claim 1, wherein, in the first direction, a converging angle of each of the micro lenses is within a range between 20° and 30°.

5. The display apparatus as defined in claim 1, wherein, each of the micro lenses is a micro-scale lens that one-to-one corresponds to a pixel and can collect light traveling in the first direction and the second direction.

6. The display apparatus as defined in claim 1, wherein, a distance between a focal point of each of the micro lenses and the pixels on the display panel is in a range not more than ⅓ of a distance between the micro lenses and the pixels.

7. The display apparatus as defined in claim 6, wherein, while the distance is in said range, the focal point is closer to the micro lenses than to the pixels.

8. A method for manufacturing the display apparatus as defined in claim 1, comprising:

manufacturing the micro lenses including steps comprising:

(a) applying photosensitive resin, which is a material of the micro lenses, to a surface of the display panel, the surface being on a backlight side;

(b) exposing the photosensitive resin material to light, through pixel apertures of the display panel; and (c) developing the photosensitive resin material that has been subjected to exposure.

9. The display apparatus as defined in claim 1, wherein, the display panel is provided with a linear polarization plate, and the light emitted from the backlight is linearly polarized, and a main polarization direction of light entering the linear polarization plate is in parallel to a transmission axis of the polarization plate.

10. The display apparatus as defined in claim 9, wherein, the main polarization direction is in parallel to the first direction.

11. The display apparatus as defined in claim 9, wherein, a polarization cross angle between the transmission axis of the linear polarization plate and the main polarization direction is not more than a range of ±20°.

12. The display apparatus as defined in claim 11, wherein, between the display panel and the backlight, a polarization rotation element for causing the polarization cross angle to be within said range is provided.

13. The display apparatus as defined in claim 1, wherein, a polarization plate, which allows linearly-polarized light emitted from the backlight and vibrating in one direction to pass through, is attached on a surface of the backlight, the surface being on a display panel side.

14. The display apparatus as defined in claim 1, wherein, the display panel is a liquid crystal panel.

15. An electronic device, comprising the display apparatus defined in claim 14.

16. The display apparatus as defined in claim 1, wherein each of the pixels has a rectangular shape that is short in the second direction while long in the first direction.

17. The display apparatus as defined in claim 1, wherein the backlight includes an optical waveguide and dot-shaped light sources that irradiate the optical waveguide with light,
the dot-shaped light sources being linearly disposed so as to face that side of the optical waveguide which extends along the second direction.

18. The display apparatus as defined in claim 1, wherein the backlight includes an optical waveguide and a cold-cathode tube that irradiates the optical waveguide with light,
the cold-cathode tube being disposed so as to face that side of the optical waveguide which extends along the first direction.

19. A display apparatus that reproduces an image by applying light from a backlight to a display panel and controlling light transmittance states of pixels provided, on the display panel, in a matrix manner,
wherein,
the display panel includes a micro lens array including a group of micro lenses corresponding to the pixels,
the pixels on the display panel are disposed in a matrix manner and along a first direction and a second direction orthogonal to the first direction, and a pitch of the pixels in the first direction is longer than a pitch of the pixels in the second direction, and each of the pixels has a rectangular shape that is short in the second direction while long in the first direction,
an intensity-half width angle of the light, emitted from the backlight and yet to reach the micro lens array, is not more than ±20° in the first direction and the second direction, the intensity-half-width angle being an angle of emission of the light along the first direction and the second direction, and
the light from the backlight traveling in the first direction is collected by the micro lens array.

20. The display apparatus as defined in claim 19, wherein, the display panel is a liquid crystal panel.

21. An electronic device, comprising the display apparatus defined in claim 19.

22. The display apparatus as defined in claim 19, wherein the backlight irradiates the micro lens array with light that is higher in directivity along the first direction than along the second direction.

23. A display apparatus that reproduces an image by applying light from a backlight to a display panel and controlling light transmittance states of pixels provided, on the display panel, in a matrix manner, wherein, the display panel comprises:
a micro lens array, provided on the display panel so as to face the backlight, which includes a group of micro lenses corresponding to the pixels,
the pixels on the display panel are disposed in a matrix manner and along a first direction and a second direction orthogonal to the first direction, and a pitch of the pixels in the first direction is longer than a pitch of the pixels in the second direction,
the backlight irradiates the micro lens array with light that is higher in directivity at an angle of irradiation along the first direction than at an angle of irradiation along the second direction,
wherein the display panel is provided with a linear polarization plate, and the light emitted from the backlight is linearly polarized,
wherein a main polarization direction of light entering the linear polarization plate is in parallel to a transmission axis of the polarization plate, and
wherein the main polarization direction is in parallel to the first direction.

24. A display apparatus that reproduces an image by applying light from a backlight to a display panel and controlling light transmittance states of pixels provided, on the display panel, in a matrix manner, wherein, the display panel comprises:
a micro lens array, provided on the display panel so as to face the backlight, which includes a group of micro lenses corresponding to the pixels,
the pixels on the display panel are disposed in a matrix manner and along a first direction and a second direction orthogonal to the first direction, and a pitch of the pixels in the first direction is longer than a pitch of the pixels in the second direction,
the backlight irradiates the micro lens array with light that is higher in directivity at an angle of irradiation along the first direction than at an angle of irradiation along the second direction,
wherein the display panel is provided with a linear polarization plate, and the light emitted from the backlight is linearly polarized,
wherein a main polarization direction of light entering the linear polarization plate is in parallel to a transmission axis of the polarization plate, and
wherein a polarization cross angle between the transmission axis of the linear polarization plate and the main polarization direction is not more than a range of ±20°.

25. A display apparatus that reproduces an image by applying light from a backlight to a display panel and controlling light transmittance states of pixels provided, on the display panel, in a matrix manner, wherein the display panel comprises:
a micro lens array including a group of micro lenses corresponding to the pixels,
the pixels on the display panel are disposed in a matrix manner and along a first direction and a second direction orthogonal to the first direction, and a pitch of the pixels in the first direction is longer than a pitch of the pixels in the second direction, and each of the pixels has a rectangular shape that is short in the second direction while long in the first direction,
an intensity-half-width angle of the light, emitted from the backlight and yet to reach the micro lens array, is not more than ±20° in the first direction and the second direction, the intensity-half-width angle being an angle of emission of the light along the first direction and the second direction, and
the light traveling in the first direction is collected by the micro lens array,
wherein the display panel is provided with a linear polarization plate, and the light emitted from the backlight is linearly polarized,
wherein a main polarization direction of light entering the linear polarization plate is in parallel to a transmission axis of the polarization plate, and wherein the main polarization direction is in parallel to the first direction.

26. A display apparatus that reproduces an image by applying light from a backlight to a display panel and controlling light transmittance states of pixels provided, on the display panel, in a matrix manner, wherein the display panel comprises:

a micro lens array including a group of micro lenses corresponding to the pixels, the pixels on the display panel are disposed in a matrix manner and along a first direction and a second direction orthogonal to the first direction, and a pitch of the pixels in the first direction is longer than a pitch of the pixels in the second direction, and each of the pixels has a rectangular shape that is short in the second direction while long in the first direction, an intensity-half-width angle of the light, emitted from the backlight and yet to reach the micro lens array, is not more than ±20° in the first direction and the second direction, the intensity-half-width angle being an angle of emission of the light along the first direction and the second direction, and the light traveling in the first direction is collected by the micro lens array, wherein the display panel is provided with a linear polarization plate, and the light emitted from the backlight is linearly polarized, wherein a main polarization direction of light entering the linear polarization plate is in parallel to a transmission axis of the polarization plate, and wherein a polarization cross angle between the transmission axis of the linear polarization plate and the main polarization direction is not more than a range of ±20°.

* * * * *